United States Patent
Shimamoto et al.

(10) Patent No.: US 8,890,995 B2
(45) Date of Patent: Nov. 18, 2014

(54) IMAGE PICKUP APPARATUS, SEMICONDUCTOR INTEGRATED CIRCUIT AND IMAGE PICKUP METHOD

(75) Inventors: Takeshi Shimamoto, Osaka (JP); Takashi Kawamura, Kyoto (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 13/809,951

(22) PCT Filed: Apr. 12, 2012

(86) PCT No.: PCT/JP2012/002555
§ 371 (c)(1),
(2), (4) Date: Jan. 14, 2013

(87) PCT Pub. No.: WO2012/140899
PCT Pub. Date: Oct. 18, 2012

(65) Prior Publication Data
US 2013/0113984 A1 May 9, 2013

(30) Foreign Application Priority Data
Apr. 15, 2011 (JP) ................. 2011-090782

(51) Int. Cl.
| G03B 13/00 | (2006.01) |
| H04N 5/232 | (2006.01) |
| H04N 5/228 | (2006.01) |
| G03B 17/00 | (2006.01) |
| G02B 27/00 | (2006.01) |
| G03B 13/32 | (2006.01) |
| G03B 7/08 | (2014.01) |
| G03B 15/00 | (2006.01) |
| G02B 7/28 | (2006.01) |

(52) U.S. Cl.
CPC ............... *G03B 13/32* (2013.01); *G03B 15/00* (2013.01); *G02B 27/0075* (2013.01); *H04N 5/23212* (2013.01); *G02B 7/28* (2013.01); *G03B 7/08* (2013.01)
USPC ........... 348/348; 348/222.1; 348/345; 396/77

(58) Field of Classification Search
USPC .......... 348/222.1, 335, 345–357; 396/72–88, 396/121–124
See application file for complete search history.

(56) References Cited

U.S. PATENT DOCUMENTS 5,148,502 A 9/1992 Tsujiuchi et al.
5,877,809 A * 3/1999 Omata et al. .................. 348/345

(Continued)

FOREIGN PATENT DOCUMENTS

DE 2 301 800 A1 10/1974
JP 05-027084 B 4/1993

(Continued)

OTHER PUBLICATIONS

International Search Report for corresponding International Application No. PCT/JP2012/002555 mailed Jul. 17, 2012.

(Continued)

*Primary Examiner* — Michael Osinski
(74) *Attorney, Agent, or Firm* — Renner, Otto, Boisselle & Sklar, LLP

(57) ABSTRACT

An image pickup device includes an image pickup element; a lens optical system including a focus lens; a driving section for driving one of the image pickup element and the focus lens so as to change a distance between the image pickup element and the focus lens; a displacement control section configured to output an instruction to the driving section to control displacement of the image pickup element or the focus lens which is driven, based on a prescribed displacement pattern; and a synchronization section configured to control the displacement control section based on timing for exposing the image pickup element.

16 Claims, 18 Drawing Sheets

(56) References Cited

U.S. PATENT DOCUMENTS

| | | | |
|---|---|---|---|
| 7,110,185 B2* | 9/2006 | Saori | 359/666 |
| 7,711,259 B2 | 5/2010 | Daley | |
| 8,390,729 B2* | 3/2013 | Long et al. | 348/345 |
| 2001/0035910 A1* | 11/2001 | Yukawa et al. | 348/349 |
| 2003/0025821 A1* | 2/2003 | Bean et al. | 348/345 |
| 2005/0162534 A1* | 7/2005 | Higashiyama et al. | 348/240.1 |
| 2007/0196093 A1* | 8/2007 | Tanaka | 396/133 |
| 2007/0216796 A1* | 9/2007 | Lenel et al. | 348/345 |
| 2008/0002960 A1* | 1/2008 | Ito et al. | 396/125 |
| 2008/0013941 A1* | 1/2008 | Daley | 396/121 |
| 2008/0031327 A1 | 2/2008 | Wang et al. | |
| 2009/0028539 A1* | 1/2009 | Nakahara | 396/104 |
| 2009/0059057 A1* | 3/2009 | Long et al. | 348/343 |
| 2010/0073514 A1* | 3/2010 | Hayashi | 348/229.1 |
| 2010/0073529 A1* | 3/2010 | Uchida | 348/262 |
| 2010/0178045 A1 | 7/2010 | Hongu | |
| 2010/0259637 A1* | 10/2010 | Suzuki | 348/222.1 |
| 2011/0115966 A1* | 5/2011 | Ueda et al. | 348/345 |
| 2011/0292275 A1* | 12/2011 | Kawamura | 348/345 |
| 2011/0292364 A1* | 12/2011 | Kawamura | 355/55 |
| 2012/0026386 A1* | 2/2012 | Tomita | 348/345 |

FOREIGN PATENT DOCUMENTS

| | | |
|---|---|---|
| JP | 3084130 B | 6/2000 |
| JP | 3191928 B | 5/2001 |
| JP | 2009-139867 A | 6/2009 |
| JP | 2009-206831 A | 9/2009 |
| JP | 2009-545929 T | 12/2009 |
| JP | 2010-175435 A | 8/2010 |
| KR | 10-2009-0060943 A | 6/2009 |

OTHER PUBLICATIONS

Nagahara et al., "Flexible Depth of Field Photography", European Conference on Computer Vision (ECCV), Oct. $16^{th}$, Morning Session 2: Computational Photography (2008).

Matsui et al., "Focus Sweep Imaging for Depth From Defocus", Information Processing Society of Japan, SIG Notes, 2010-CVIM-174, No. 6 (2010) and English Abstract.

Co-pending U.S. Appl. No. 14/075,506, filed Nov. 8, 2013.

Co-pending U.S. Appl. No. 14/123,421, filed Dec. 2, 2013.

Extended European Search Report dated Aug. 26, 2014 for corresponding European Application No. 12771918.5.

* cited by examiner

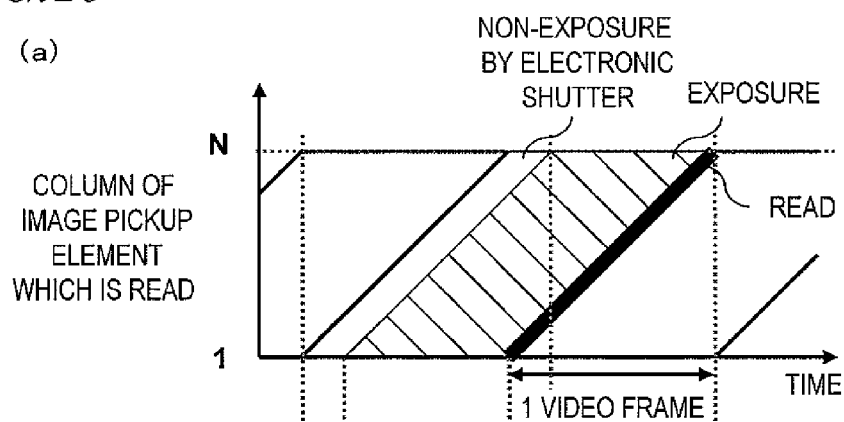
FIG.10
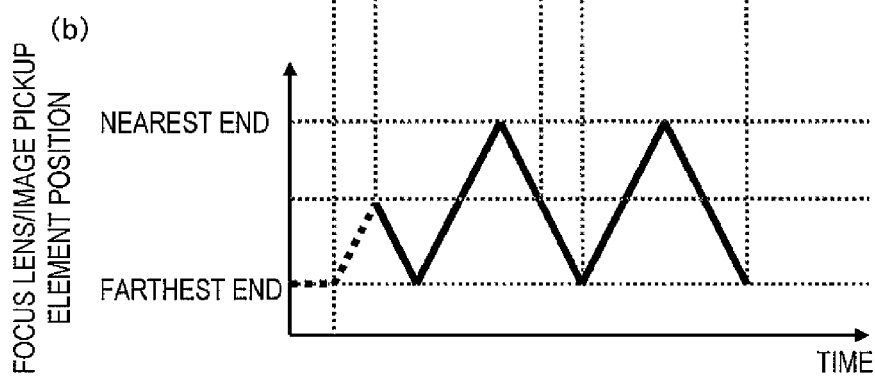
FIG.11
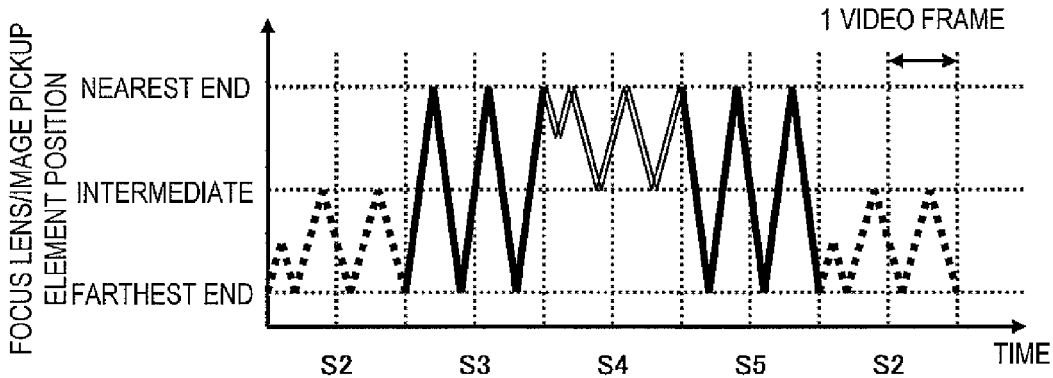

NEAREST END    FARTHEST END (a)          (b)          (c)

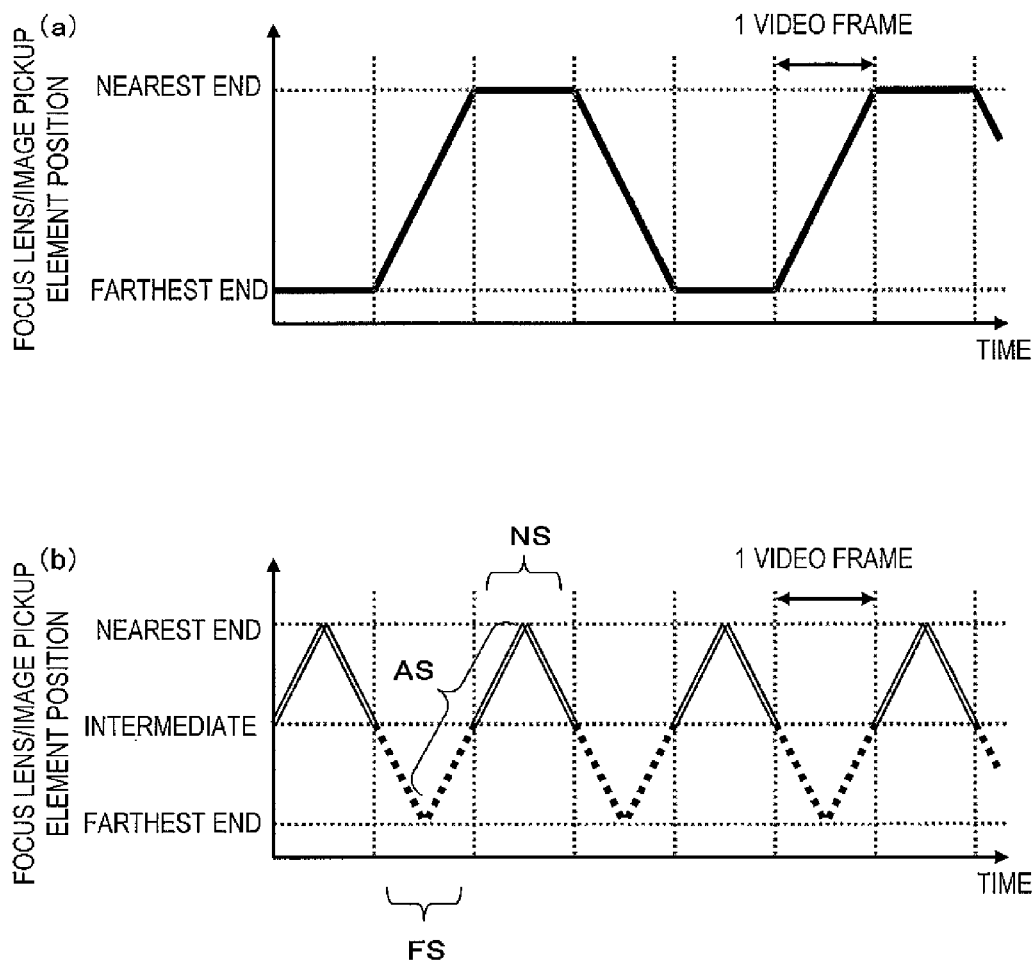

IMAGE PICKUP APPARATUS, SEMICONDUCTOR INTEGRATED CIRCUIT AND IMAGE PICKUP METHOD

TECHNICAL FIELD

The present invention relates to an image pickup device capable of shooting a moving image utilizing a technology of Extended Depth of Field.

BACKGROUND ART

As methods for realizing Extended Depth of Field (hereinafter, referred to as "EDOF") in an image pickup device, various methods have been proposed. According to one example of such proposed methods, a focus sweep motion of moving a focus lens or an image pickup element during an exposure time duration is performed, images focused uniformly are convoluted in a depth direction (i.e., blur is uniformized at each depth), and image recovery processing is performed by use of a blur pattern obtained in advance by measurement or simulation. Thus, an EDOF image is obtained (Non-Patent Document 1). This method is referred to as Flexible DOF (hereinafter, referred to as "F-DOF").

F-DOF is known as a method for providing a high quality image, and provides a high EDOF effect. Since the off-axis property thereof depends on the lens characteristics themselves, the performance can be improved easily. However, even if the focus position is moved during exposure, the same subject needs to be convoluted at the same image position. Therefore, F-DOF needs to be performed under an optical condition that an image-side telecentric lens is used. One of the fields of application of the EDOF technology is microscope. When image pickup is performed by a microscope, it is possible to take time for shooting because the target of shooting is a still object. Thus, a Focal Stack system have been used for many years. According to this system, a plurality of images with different focus positions are shot, and an area which appears to be focused is extracted from each image and these areas are synthesized. Thus, an EDOF image is obtained. Since such a work is labor- and time-consuming, technologies of using an F-DOF system in combination with the Focal Stack system have been proposed (Patent Documents 1 through 4). In the case where F-DOF is used for a microscope, a sample as a subject or a lens barrel is moved during exposure. In the case where image recovery processing is to be performed after exposure, the subject or the lens barrel is moved such that the blur of the image is always uniform. It is known that this method is reasonable because when the manner of movement is controlled appropriately, an image recovery processing method using a single blur pattern can be applied (Patent Document 5). For this purpose, the image pickup element is moved at a constant speed when the image pickup element is to be moved. When the focus lens is to be moved, the focus lens needs to be displaced by a distance corresponding to the movement of the image pickup element at a constant speed (Non-Patent Document 1). It is known that the pattern of movement may be from a far-side focus end position to a near-side focus end position, or vice versa.

An example thereof is shown in FIG. 12. FIGS. 12(a) and (b) respectively show an exposure state and a read state of the image pickup element. The horizontal axis represents the time. FIG. 12(c) shows the displacement of the focus lens. The horizontal axis represents the time, and the vertical axis represents the focus position. In FIGS. 12(a) and (b), the hatched area represents the timing for exposing the image pickup element and the timing for reading data. The image pickup element is exposed in synchronization with an operation of displacing the focus position from a near-side focus position to a far-side focus position. Thus, an image is obtained in which subjects located at various positions in one, same scene are convoluted at one, same image position in a focused state. Hereinafter, such displacement of the focus position will be referred to as a "sweep pattern", and an image obtained by a sweep pattern will be referred to as a "sweep image". Another example is shown in FIG. 12(d). In this example, a sweep image is obtained by displacing the focus position between the near-side focus position and the far-side focus position in a reciprocating manner during the exposure time duration of the image pickup element. Even with such a sweep pattern, as long as the focus lens is displaced at a constant speed in straight line areas, the exposure time duration is uniform at the focus positions. Therefore, a sweep image equivalent to that described with reference to FIG. 12(c) can be obtained.

This technology is applicable to usual digital still cameras and digital video cameras. Recently, digital still cameras and digital video cameras are required to have performance which allows shooting to be done more easily and with less failures. The EDOF technology is expected to provide an effect of shooting an all-in-focus image, namely, an effect of decreasing focusing errors. When an EDOF technology is used for a digital still camera or a digital video camera, the F-DOF system is considered to be preferable because of the following reasons. With the F-DOF system, a high quality is provided, a splendid EDOF effect is provided, the EDOF range can be freely changed, a usual auto-focus mechanism can be applied (no specific optical system needs to be prepared), it is easy to switch the EDOF shooting and the usual shooting to each other, and the like.

CITATION LIST

Patent Literature

Patent Document 1: German Patent No. 2301800
Patent Document 2: Japanese Patent Publication for Opposition No. 5-27084
Patent Document 3: Japanese Patent No. 3191928
Patent Document 4: U.S. Pat. No. 7,711,259
Patent Document 5: Japanese Patent No. 3084130

Non-Patent Literature

Non-Patent Document 1: H. Nagahara, S. Kuthirummal, C. Zhou and S. Nayar, "Flexible Depth of Field Photography", European Conference on Computer Vision (ECCV), Oct. 16th, Morning Session 2: Computational Photography (2008)
Non-Patent Document 2: Shuhei MATSUI, Hajime NAGAHARA, Rin'ichiro TANIGUCHI, "Focus Sweep Imaging for Depth From Defocus", Information Processing Society of Japan, SIG Notes, 2010-CVIM-174, No. 6 (2010)

SUMMARY OF INVENTION

Technical Problem

In the case where EDOF is used for a digital still camera or a digital video camera, it is preferable that EDOF shooting can be performed also for shooting a moving image. The present application provides an image pickup device capable of shooting a high quality EDOF moving image, and an integrated circuit and an image pickup method usable for such an image pickup device.

Solution to Problem

An image pickup device according to an embodiment of the present invention includes an image pickup element including a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal; a lens optical system including a focus lens for collecting light toward the image pickup element; a driving section for driving one of the image pickup element and the focus lens so as to change a distance between the image pickup element and the focus lens; a displacement control section configured to output an instruction to the driving section to control displacement of the image pickup element or the focus lens which is driven, based on a prescribed displacement pattern; and a synchronization section configured to control the displacement control section based on timing for exposing the image pickup element. Where first and second focus positions of the focus lens or the image pickup element provide focusing at first and second subject distances respectively in an image pickup scene, the displacement pattern includes a first type of displacement pattern by which the focus lens or the image pickup element is displaced in a displacement range between the first focus position and the second focus position, and a second type of displacement pattern by which the focus lens or the image pickup element is displaced in another displacement range between the first focus position and the second focus position; the first type of displacement pattern and the second type of displacement pattern being alternately repeated.

Advantageous Effects of Invention

According to an image pickup device disclosed by this application, the focus lens or the image pickup element is displaced, and sweep image pickup for obtaining an all-in-focus image and sweep image pickup for obtaining depth information are repeated alternately by an F-DOF system. Thus, shooting providing both of a high quality all-in-focus image and a high measurement precision of depth information can be performed.

BRIEF DESCRIPTION OF DRAWINGS

FIGS. 4($b$) and ($c$) each show another example of displacement pattern.

FIGS. 7($b$) and ($a$) each show an example of displacement pattern of the focus lens.

FIG. 10($a$) shows the timing for exposing the image pickup element and performing read in the case where an exposure time duration is restricted by use of an electronic shutter in Embodiment 3; and FIG. 10($b$) shows an example of displacement pattern of the focus lens in this case.

FIG. 11 shows an example of displacement pattern of the focus lens or the image pickup element in the case where the exposure time duration is restricted by use of an electronic shutter in Embodiment 3.

FIGS. 12($c$) and ($d$) each show a displacement pattern of the focus lens for obtaining an EDOF image in correspondence with the exposure timing in each of FIGS. 12($a$) and ($b$).

FIGS. 21($a$) and ($b$) each show a displacement pattern of the focus lens for obtaining a full sweep image and a half sweep image.

DESCRIPTION OF EMBODIMENTS

The present inventors made detailed studies regarding structures suitable for obtaining an EDOF moving image by a digital still camera or a digital video camera which includes an auto-focus mechanism or any other mechanism for driving a focus lens, which is used for usual image shooting.

Figure 13:
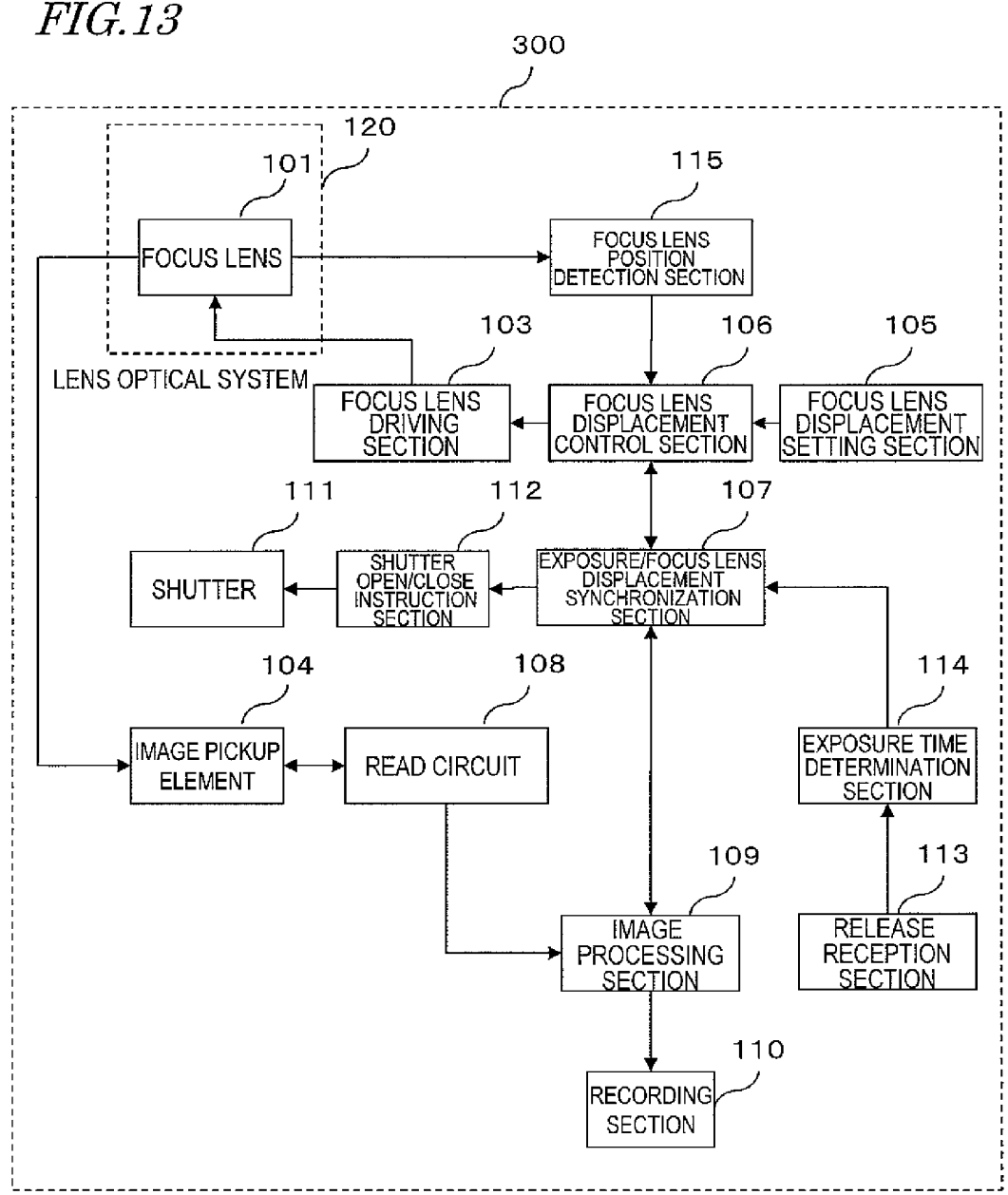
FIG. 13 is a block structural diagram of an image pickup device studied by the present inventors.

First, with reference to FIG. 13, a structure required to realize shooting by an F-DOF system will be described. An image pickup device 300 shown in FIG. 13 has a structure of displacing a focus lens 101 during an exposure time duration. The image pickup device 300 includes an optical system 120 including the focus lens 101, a focus lens driving section 103 for driving the focus lens 101, and an image pickup element 104. By changing the position of the focus lens 101, a distance between the focus lens 101 and the image pickup element 104 is changed, and thus the focal distance can be changed. Assuming that the focus lens 101 is fixed, the change of the focal distance has the same meaning as the change of a focus position.

When a release reception section 113 receives an exposure start instruction from a user, a focus lens position detection section 115 detects a position of the focus lens 101 at that point (initial position). After the detection, the focus lens position detection section 115 displaces the focus lens 101 to a prescribed end position, for example, a nearest position or a farthest position.

Figure 14:
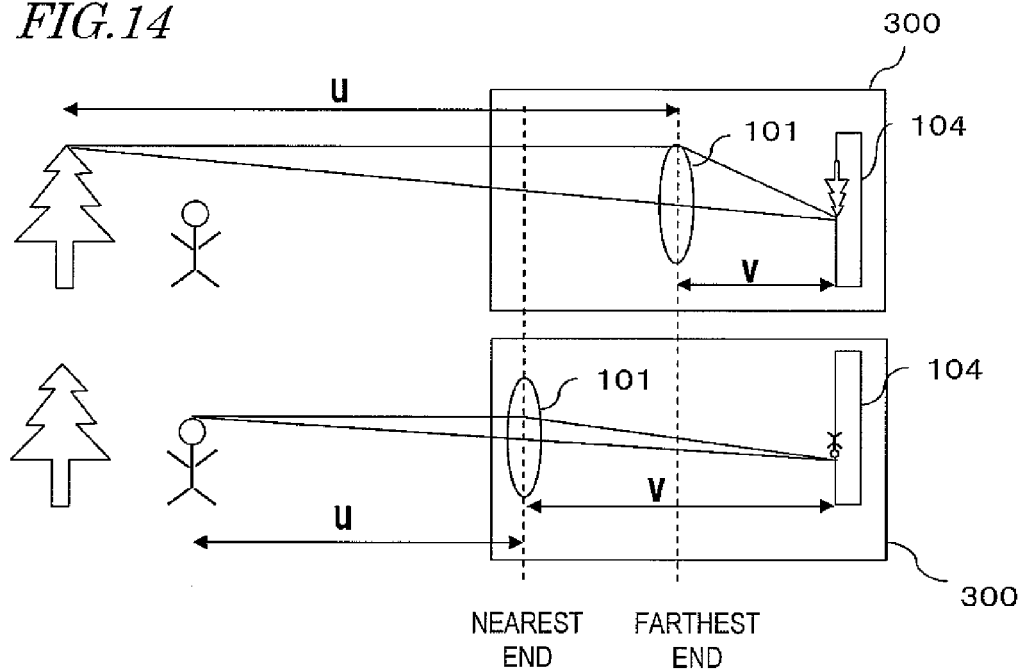
FIG. 14 shows the positional relationship among a subject, a focus lens and an image pickup element.

FIG. 14 is a schematic view showing the positional relationship of a subject included in a shooting scene with the focus lens 101 and the image pickup element 104 of the image pickup device 300.

The "nearest end" is the following position. The focus lens 101 is moved such that an image of a subject, among subjects included in the shooting scene, which is nearest to the image pickup device 300 is formed on an image pickup plane of the image pickup element 104. The position of the focus lens 101 in this case is the "nearest end". At this point, a distance u from the subject, the image of which is focused on the image pickup plane, to the focus lens 101 of the image pickup device 300 is shortest, and a distance v between the focus lens 101 and the image pickup element 104 is longest.

The "farthest end" is the following position. The focus lens 101 is moved such that an image of a subject, among subjects included in the shooting scene, which is farthest from the image pickup device 300 is formed on the image pickup plane of the image pickup element 104. The position of the focus lens 101 in this case is the "farthest end". At this point, the distance u from the subject, the image of which is focused on the image pickup plane, to the focus lens 101 of the image pickup device 300 is longest, and the distance v between the focus lens 101 and the image pickup element 104 is shortest. In FIG. 14, the distance between the nearest end and the farthest end of the focus lens 101 is shown longer than the distance between the subject and the image pickup device 300 for easier illustration.

At the same time as an initialization operation of the focus lens 101, an exposure time determination section 114 determines shooting parameters such as the shutter speed, diaphragm stop and the like. Soon after these operation are finished, an exposure/focus lens displacement synchronization section 107 for synchronizing the exposure and the displacement of the focus lens outputs an exposure start instruction to a focus lens displacement control section 106 and a shutter open/close instruction section 112. At the same time, based on the end position of the focus lens 101 detected by a focus lens position detection section 102, the exposure/focus lens displacement synchronization section 107 outputs an instruction to the focus lens displacement control section 106 to displace the focus lens 101, during the exposure time duration, from the farthest end to the nearest end in the case where the end position is the farthest end, or from the nearest end to the farthest end in the case where the end position is the nearest end.

Figure 15:
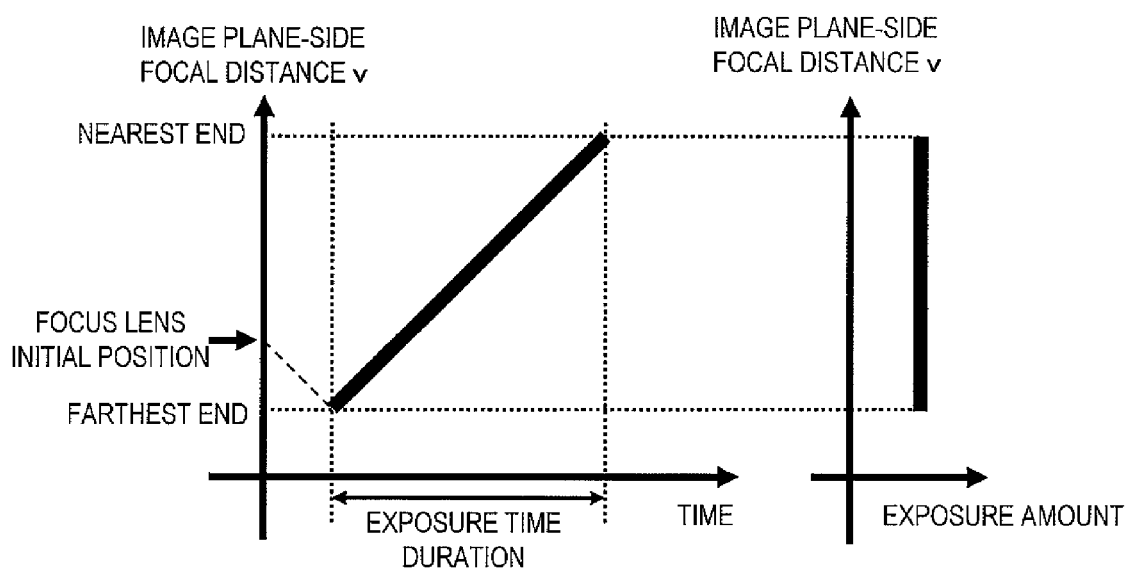
FIG. 15 shows the relationship between the position of the focus lens and the exposure time duration in the image pickup device shown in FIG. 13.

FIG. 15 shows the relationship of the exposure time duration and the exposure amount with the focal distance on the image plane side. The focal distance on the image plane side is changed in accordance with the position of the focus lens 101. The focus lens 101 is driven by the focus lens driving section 103 based on the instruction from the focus lens displacement control section 106, such that the focus lens is displaced with respect to the image pickup plane at a constant speed. Where the distance between the subject and the focus lens 101 is u and the distance between the focus lens 101 and the image pickup element 104 is v as described above, and where the focal distance is f, the following relationship generally holds from the formula regarding lens:

$$1/f = 1/u + 1/v \quad \text{(expression 1)}$$

Figure 16:
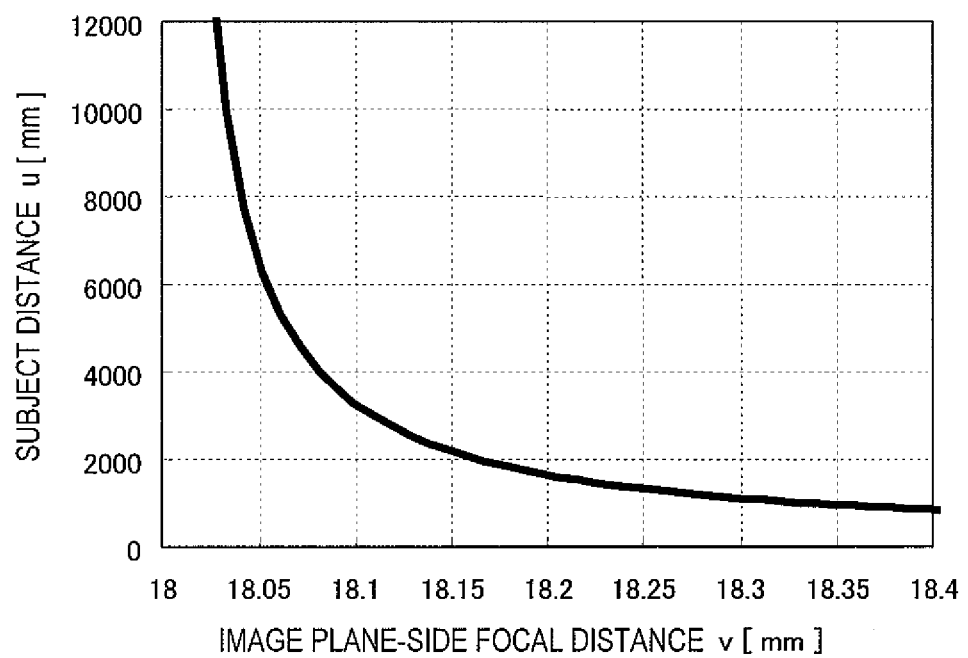
FIG. 16 is a graph showing an example of relationship between the subject distance u and the image plane-side focal distance v.

In the case where there are a plurality of lenses, considerations is made based on the position of the principal point of the lenses. As an example, FIG. 16 shows the relationship between u and v when f is 18 [m]. When the focus lens 101 is displaced, the distance v between the principal point of the lenses and the image pickup element is changed. "Driving the focus lens 101 such that the focus lens is displaced with respect to the image pickup plane at a constant speed" means that the change rate of v is fixed. As shown in FIG. 16, even when v is changed at a constant speed, the distance u between the focus plane on the subject side and the principal point of the lenses is not changed at a constant speed. Since the horizontal axis of FIG. 16 represents the image plane-side focal distance v, increase/decrease of v has an opposite relationship to increase/decrease of the subject distance u. Namely, as the subject distance u is longer (i.e., the subject is located farther), the image plane-side focal distance v is shorter.

Soon after receiving the exposure start instruction from the exposure/focus lens displacement synchronization section 107, the shutter open/close instruction section 112 controls a shutter 111 to be opened. A prescribed exposure time duration later, the exposure/focus lens displacement synchronization section 107 outputs an exposure finish instruction to the shutter open/close instruction section 112. The shutter open/close instruction section 112 receives the exposure termination instruction and soon controls the shutter 111 to be closed.

When an optical image of the subject is formed on the image pickup element 104 by the above-described procedure, the optical image formed is converted into an electrical signal by the image pickup element 104, and an image signal is output to an image processing section 109 via a read circuit 108. At the same time, the exposure/focus lens displacement synchronization section 107 notifies the image processing section 109 that the exposure has been finished and that shooting has been performed with the focus lens being displaced by F-DOF. The image processing section 109 receives the image signal, performs necessary processing and outputs the result to a recording section 110.

Figure 17:
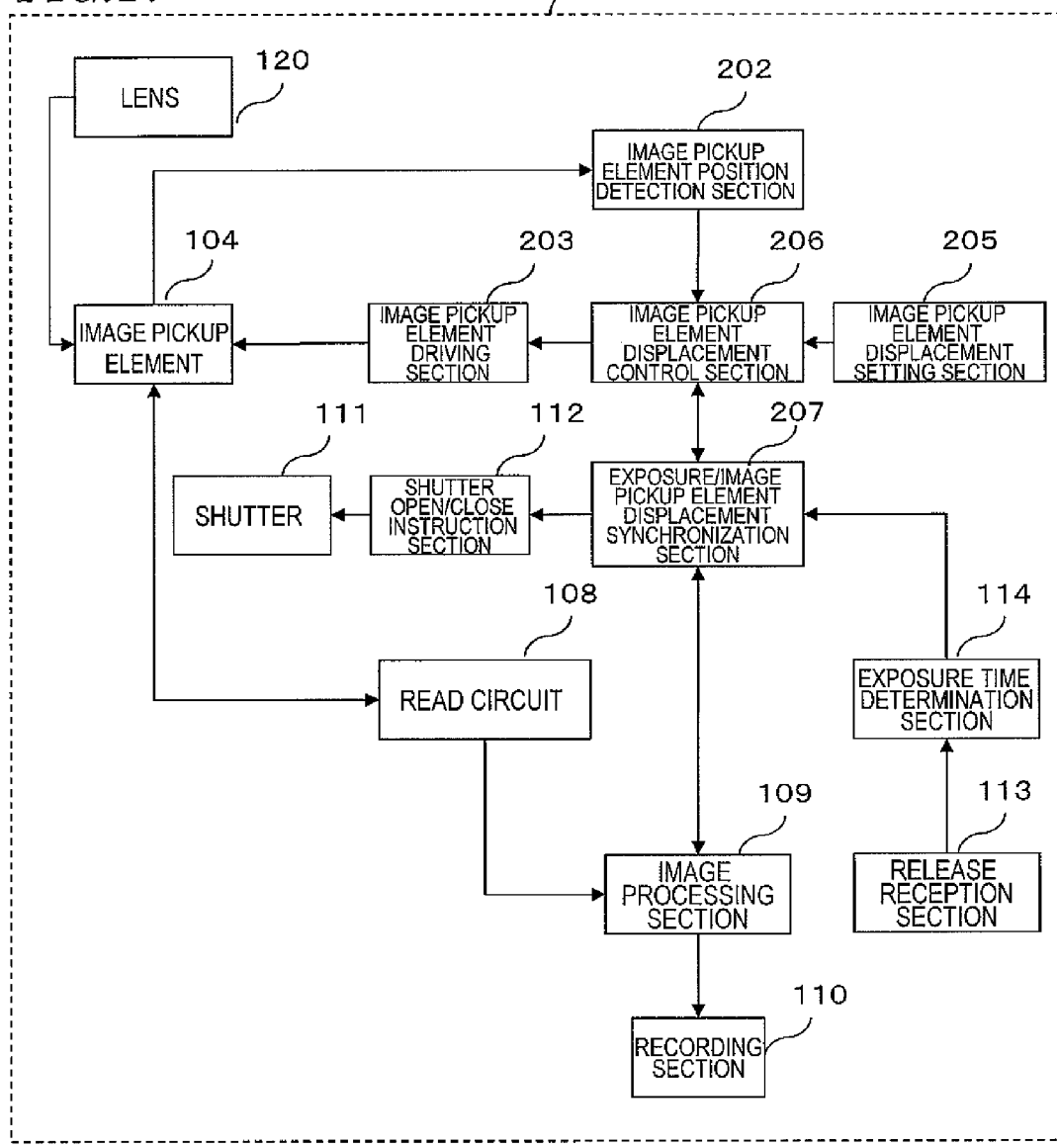
FIG. 17 is a block structural diagram of another image pickup device studied by the present inventors.

An image pickup device 400 shown in FIG. 17 includes the image pickup element 104, an image pickup element position detection section 202, an exposure/image pickup element displacement synchronization section 207, an image pickup element displacement control section 206, and an image pickup element driving section 203, and displaces the image pickup element during an exposure time duration. The image pickup element position detection section 202 detects the position of the image pickup element 104 unlike in the image pickup device 300. The exposure/image pickup element displacement synchronization section 207 synchronizes the timing of exposure and the displacement of the image pickup element 104. The image pickup element displacement control section 206 controls the displacement of the image pickup element 104. The image pickup element driving section 203 drives the image pickup element 104 upon receipt of a signal from the image pickup element displacement control section 206.

When the release reception section 113 receives an exposure start instruction from the user, the image pickup element position detection section 202 detects a position of the image pickup element 104 at that point (initial position). After the detection, the image pickup element position detection section 202 displaces the image pickup element 104 to a prescribed end position, for example, a nearest position or a farthest position. In a prescribed focus range, the "nearest end" is the following position. The image pickup element 104 is moved such that an image of subject, among subjects included in a shooting scene, which is nearest to the image pickup device 400 is formed on the image pickup plane of the image pickup element 104. The position of the image pickup element 104 in this case is the "nearest end". At this point, the distance u from the subject to the focus lens 101 is shortest, and the distance v between the focus lens 101 and the image pickup element 104 is longest. The "farthest end" is the following position. The image pickup element 104 is moved such that an image of a subject, among subjects included the shooting scene, which is farthest from the image pickup device 400 is formed on the image pickup plane of the image pickup element 104. The position of the image pickup element 104 in this case is the "farthest end". At this point, the distance u from the subject to the focus lens 101 is longest, and the distance v between the focus lens 101 and the image pickup element 104 is shortest.

At the same time as an initialization operation of the image pickup element 104, the exposure time determination section 114 determines shooting parameters such as the shutter speed, diaphragm stop and the like. Soon after these operation are finished, the exposure/image pickup element displacement synchronization section 207 for synchronizing the exposure and the displacement of the image pickup element outputs an exposure start instruction to the image pickup element displacement control section 206 and the shutter open/close instruction section 112. At the same time, based on the end position of the image pickup element 104 detected by the image pickup element position detection section 202, the exposure/image pickup element displacement synchronization section 207 outputs an instruction to the image pickup element displacement control section 206 to displace the image pickup element 104, during the exposure time duration, from the farthest end to the nearest end in the case where the end position is the farthest end, or from the nearest end to the farthest end in the case where the end position is the nearest end. The image pickup element 104 is displaced at a constant speed.

Soon after receiving the exposure start instruction from the exposure/image pickup element displacement synchronization section 207, the shutter open/close instruction section 112 controls the shutter 111 to be opened. A prescribed exposure time duration later, the exposure/image pickup element displacement synchronization section 207 outputs an exposure finish instruction to the shutter open/close instruction section 112. The shutter open/close instruction section 112 receives the exposure termination instruction and soon controls the shutter 111 to be closed.

When an optical image of the subject is formed on the image pickup element 104 by the above-described procedure, the optical image formed is converted into an electrical signal by the image pickup element 104, and the electrical signal is output to the image processing section 109 via the read circuit 108. At the same time, the exposure/image pickup element displacement synchronization section 207 notifies the image processing section 109 that the exposure has been finished and shooting has been performed with the focus lens being displaced by F-DOF. Except for this, the image pickup device 400 performs the same operation as that of the image pickup device 300 shown in FIG. 13.

Figure 18:
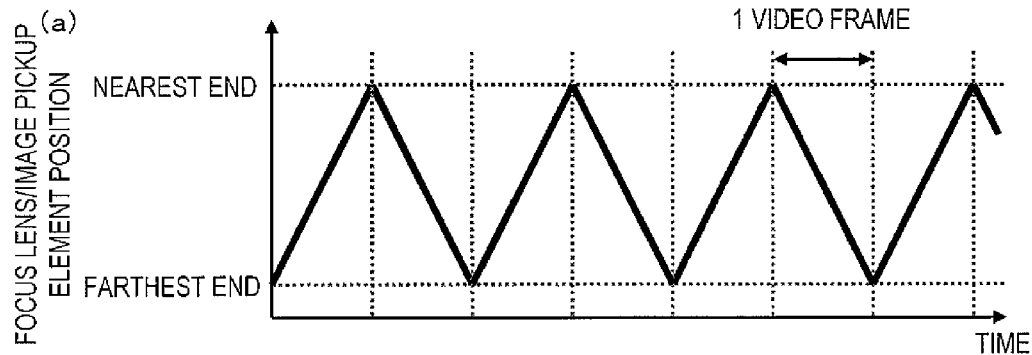
FIG. 18 shows a displacement pattern of a focus lens by an F-DOF system.

Shooting of the F-DOF system is realized by a digital still camera or a digital video camera with such a structure. For shooting a moving image, it is preferable that the shooting is performed continuously with no time lag between images of frames included in the moving image. In order to realize this, as shown in FIG. 18, during the shooting of a moving image, the focus lens is displaced in a reciprocal manner between the farthest end and the nearest end, and the forward displacement and the backward displacement are each assigned one video frame period. In this manner, a smooth EDOF moving image is realized.

When, in addition to the all-in-focus image obtained in this manner, there is depth information of the shooting scene, namely, depth information indicating which of a plurality of subject included in the shooting scene is closer to, or farther from, the viewer than the other subjects, three-dimensional information on the shooting scene can be obtained. For measuring the depth of a shooting scene, various systems have been proposed. These systems are roughly classified into an active technique and a passive technique. According to the active technique, infrared light, ultrasonic wave or laser light is output, and the distance is calculated based on the time required until the reflected wave is returned, the angle of the reflected wave, or the like. According to the passive technique, the distance is calculated based on the image of the subject. Especially in the field of camera, the passive technique, which does not require a device for outputting infrared light or the like, is in wide use.

Various passive techniques have been proposed. One of such techniques is referred to as "Depth from Defocus" (hereinafter, referred to as "DFD"), by which the distance is measured based on the blur caused by the change of focus. This technique does not require a plurality of cameras and can measure the distance based on a small number of images. As a technique for realizing DFD, a system called "half sweep" using F-DOF described above has been proposed (Non-Patent Document 2). According to this system, the range of focus sweep by F-DOF is divided into two at an intermediate focus position between a far-side focus position (farthest end) and a near-side focus position (nearest end), and the depth is estimated by use of two images obtained by sweep performed in the two ranges. At the same time, an all-in-focus image can be generated by use of these two images. Hereinafter, the above-described system of sweeping the entirety of a zone from the far-side focus end position to the near-side focus end position will be referred to as "full sweep".

Figure 19:
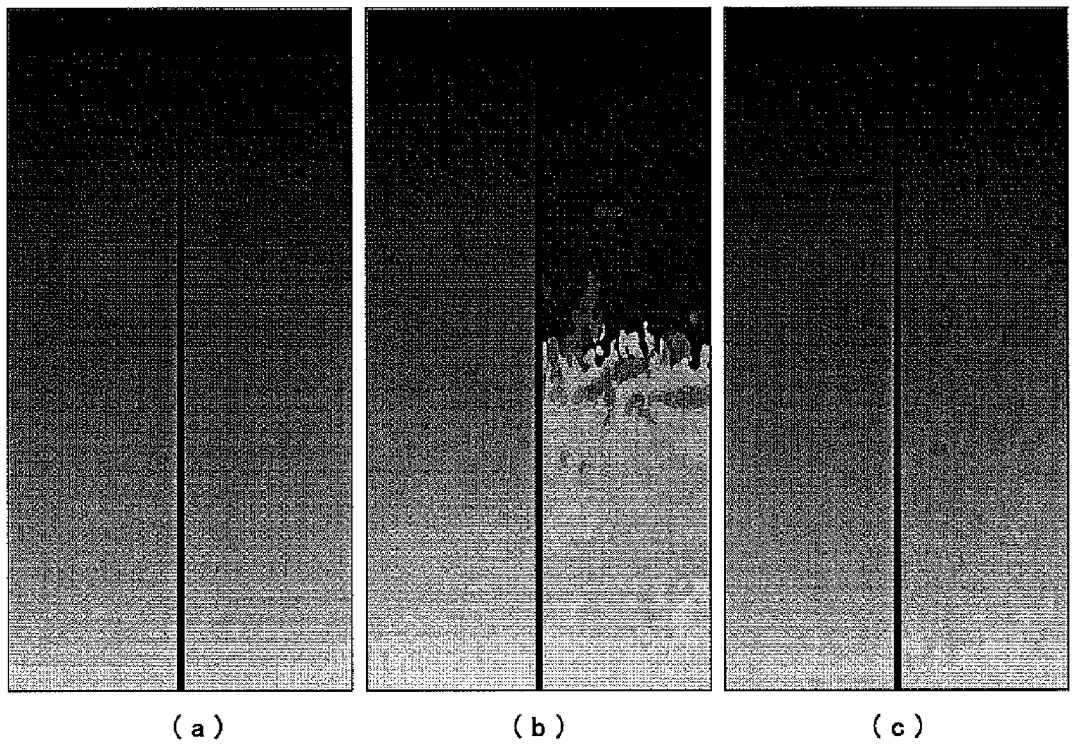
FIGS. 19($a$) through ($c$) each show measurement results performed by a depth measurement technique.
Figure 20:
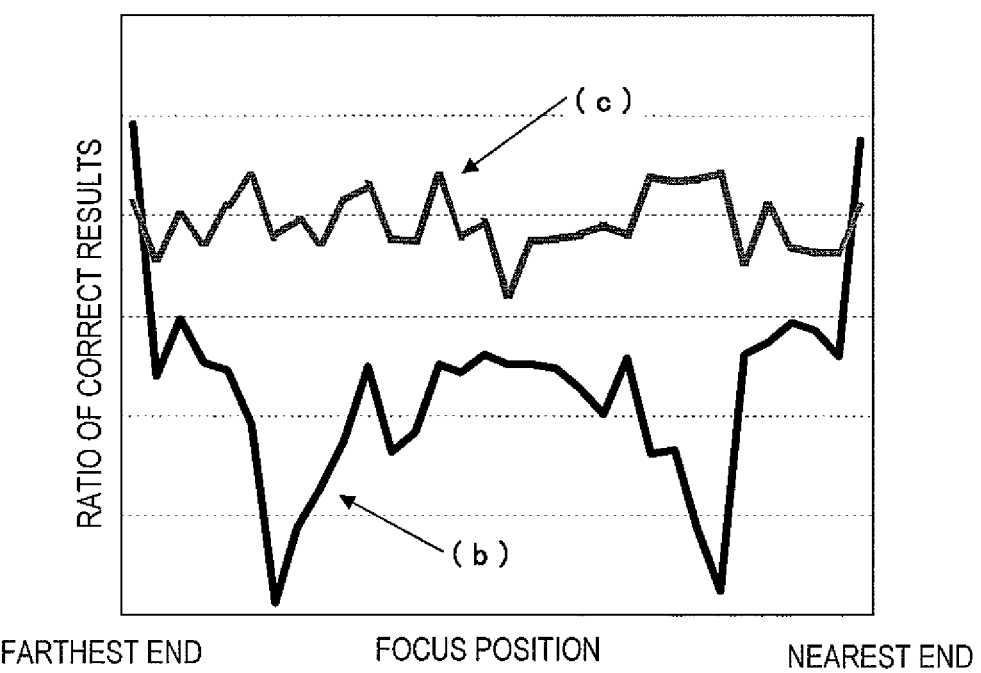
FIG. 20 shows the results of FIGS. 19($a$) through ($c$).

FIG. 19 and FIG. 20 show an example of results of depth estimation performed by DFD disclosed in Non-Patent Document 2. Regarding each of FIGS. 19(*a*), (*b*) and (*c*), the left half shows the result of estimating the depth, namely, the distance from the image pickup device, using an image having a strong texture including a large number of edges. The right half shows the result of estimating the depth, namely, the distance from the image pickup device, using an image having a weak texture having a small number of edges. In these figures, the bottom end and the top end respectively correspond to the near side and the far side of the depth. The darkness or the paleness of the hatching in these figures shows the value of the distance estimated. As the hatching is darker, the estimated distance is longer.

FIG. 19(*a*) shows a true value of the depth. More specifically, when the depth is correctly estimated, an upper position in the figure is shown with darker hatching and a lower position in the figure is shown with paler hatching. FIG. 19(*b*) shows the results of depth estimation performed by a general DFD system (full sweep system), and FIG. 19(*c*) shows the results of depth estimation performed by the half sweep system. In FIGS. 19(*b*) and 19(*c*), dark hatching is seen in an area other than the upper area. This indicates that the estimated distance is not correct. A comparison between FIGS. 19(*b*) and 19(*c*) shows that especially in the case of an image having a weak texture in the right half, depth estimation by use of the half sweep system is superb as shown in FIG. 19(*c*).

FIG. 20 shows numerical values representing the results shown in FIGS. 19(*b*) and 19(*c*). The horizontal axis represents the depth, and the top end of FIG. 19 corresponds to the left end of the horizontal axis. The vertical axis represents the ratio of correct depth estimation results shown in FIGS. 19(*b*)

and 19(c) with respect to the true values shown in FIG. 18(a). Each ratio of correct estimation results is a value collectively representing both of the area having a strong texture and the area having a weak texture (left half and the right half of the image). From FIG. 20, it is seen that the half sweep system provides a superb depth estimation.

As can be seen from the above, it is preferable to use the F-DOF system when EDOF is adopted to a digital still camera or a digital video camera. In addition, as described above, a moving image is required to be shot continuously with no time lag between images of frames. A method for realizing this is shown in FIG. 21(a). During the shooting of a moving image, the focus lens is displaced in a reciprocal manner between the farthest end and the nearest end, and the forward displacement and the backward displacement are each assigned one video frame period. In this manner, a smooth EDOF moving image can be shot. In the case where an image is acquired while the focus lens is stopped at the far-side focus position and at the near-side focus position, depth estimation for a moving image by DFD is also realized.

In the case where the F-DOF by the half sweep system is adopted, as shown in FIG. 21(b), the range in which the focus lens sweeps is divided into two at an intermediate focus position between a far-side focus position and a near-side focus position. Specifically, the focus lens is displaced in a reciprocal manner between the farthest end and the nearest end in accordance with a displacement pattern represented by near sweep NS and far sweep FS. Thus, acquisition of an all-in-focus EDOF image and depth estimation can be performed continuously in a similar manner, and thus an EDOF moving image can be shot.

However, by the half sweep system shown in FIG. 21(b), the displacement pattern for obtaining the all-in-focus image, namely, a displacement pattern AS from the farthest end to the nearest end includes a part of the near sweep NS and a part of the far sweep FS, and the displacement pattern AS is astride over two video frames. Therefore, the all-in-focus image is generated from two images shifted in terms of time. As a result, in the case where the subject is moving, the obtained all-in-focus image looks unnatural. Specifically, it has been found that the position of the subject in the image obtained by near sweep NS and the position of the subject in the image obtained by far sweep FS are shifted with respect to each other, and this causes a problem that the image quality of the all-in-focus image is significantly declined.

By contrast, in the case where the full sweep system as shown in FIG. 18 is used to obtain an all-in-focus image, one sweep image is acquired in a time duration while the focus lens moves between the farthest end and the nearest end. In this case, a blur is caused by the movement of the focus lens, but this blur is within a continuous time duration. Such a blur is a phenomenon similar to that occurring in a general video camera, and is unlikely to cause unnaturalness to the image. Namely, in order to obtain an all-in-focus image, the full sweep system is more preferable.

As described above, as a result of detailed studies, the present inventors acquired a high quality all-in-focus image and performed highly precise depth estimation on a shooting scene by use of a digital still camera or a digital video camera. Then, the present inventors found that both of the half sweep system and the full sweep system have a problem for obtaining an EDOF moving image.

In light of such a problem, the present inventors conceived a novel image pickup device. An image pickup device according to an embodiment of the present invention includes an image pickup element including a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal; a lens optical system including a focus lens for collecting light toward the image pickup element; a driving section for driving one of the image pickup element and the focus lens so as to change a distance between the image pickup element and the focus lens; a displacement control section configured to output an instruction to the driving section to control displacement of the image pickup element or the focus lens which is driven, based on a prescribed displacement pattern; and a synchronization section configured to control the displacement control section based on timing for exposing the image pickup element; wherein, where first and second focus positions of the focus lens or the image pickup element provide focusing at first and second subject distances respectively in an image pickup scene, the displacement pattern includes a first type of displacement pattern by which the focus lens or the image pickup element is displaced in a displacement range between the first focus position and the second focus position, and a second type of displacement pattern by which the focus lens or the image pickup element is displaced in another displacement range between the first focus position and the second focus position; the first type of displacement pattern and the second type of displacement pattern being alternately repeated.

The displacement range of the first type of displacement pattern includes at least a part of the displacement range of the second type of displacement pattern.

The displacement range of the first type of displacement pattern is the entirety of a range between the first focus position and the second focus position.

The second type of displacement pattern includes a second F type of displacement pattern, the displacement range of which is the entirety of a zone from the first focus position to an intermediate position between the first focus position and the second focus position, and a second N type of displacement pattern, the displacement range of which is the entirety of a zone from the intermediate position to the second focus position; and the first type of displacement pattern is sandwiched between the second F type of displacement pattern and the second N type of displacement pattern.

The first type of displacement pattern, the second F type of displacement pattern and the second N type of displacement pattern each include displacement made in the entirety of the displacement range thereof in one direction at least once.

The first type of displacement pattern and the second F type of displacement pattern are continuous to each other, and the first type of displacement pattern and the second N type of displacement pattern are continuous to each other.

The image pickup device further includes an exposure time determination section for determining an exposure time duration of the image pickup element based on the image pickup scene; and a displacement setting section for determining the displacement pattern based on the first focus position, the second focus position and the exposure time duration.

The image pickup device further includes a position detection section for detecting a position of the image pickup element or the focus lens which is driven. The displacement control section instructs the driving section of a driving amount based on an output of the position detection section and the displacement pattern.

The image pickup device further includes a read circuit for reading the image signal from the image pickup element. The synchronization section controls the displacement control section and the read circuit based on the timing for exposing the image pickup element.

The image pickup device generates an all-in-focus image based on the first type of displacement pattern from the image signal obtained during displacement of the image pickup element or the focus lens which is driven.

The image pickup device generates depth information based on the second type of displacement pattern from the image signal obtained during displacement of the image pickup element or the focus lens which is driven.

The image pickup element is a CCD image sensor.

The image pickup element is a CMOS image sensor.

The first type of displacement pattern, the second F type of displacement pattern and the second N type of displacement pattern each make a reciprocating motion in at least the entirety of the displacement range thereof by an integral number of times.

An integrated circuit according to an embodiment of the present invention is an integrated circuit of an image pickup device which includes an image pickup element including a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal; a lens optical system including a focus lens for collecting light toward the image pickup element; and a driving section for driving one of the image pickup element and the focus lens so as to change a distance between the image pickup element and the focus lens. The integrated circuit includes a displacement control section configured to output an instruction to the driving section to control displacement of the image pickup element or the focus lens which is driven, based on a prescribed displacement pattern; and a synchronization section configured to control the displacement control section based on timing for exposing the image pickup element. Where first and second focus positions of the focus lens or the image pickup element provide focusing at first and second subject distances respectively in an image pickup scene, the displacement pattern includes a first type of displacement pattern by which the focus lens or the image pickup element is displaced in a displacement range between the first focus position and the second focus position, and a second type of displacement pattern by which the focus lens or the image pickup element is displaced in another displacement range between the first focus position and the second focus position; the first type of displacement pattern and the second type of displacement pattern being alternately repeated.

An image pickup method according to an embodiment of the present invention is an image pickup method for forming an image of an image pickup scene by collecting light by a focus lens on an image pickup element which includes a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal. Where first and second focus positions of the focus lens or the image pickup element provide focusing at first and second subject distances respectively in an image pickup scene, the plurality of photoelectric elements are exposed while the focus lens or the image pickup element is displaced by a first type of displacement pattern by which the focus lens or the image pickup element is displaced in a displacement range between the first focus position and the second focus position, and by a second type of displacement pattern by which the focus lens or the image pickup element is displaced in another displacement range between the first focus position and the second focus position.

Hereinafter, embodiments of an image pickup device, an integrated circuit, and an image pickup method according to the present invention will be described in detail with respect to the drawings. In the following description, identical elements bear identical reference signs, and descriptions thereof may be omitted.

(Embodiment 1)

Hereinafter, an image pickup device, an integrated circuit, and an image pickup method in Embodiment 1 according to the present invention will be described with respect to the figures.

Figure 1:
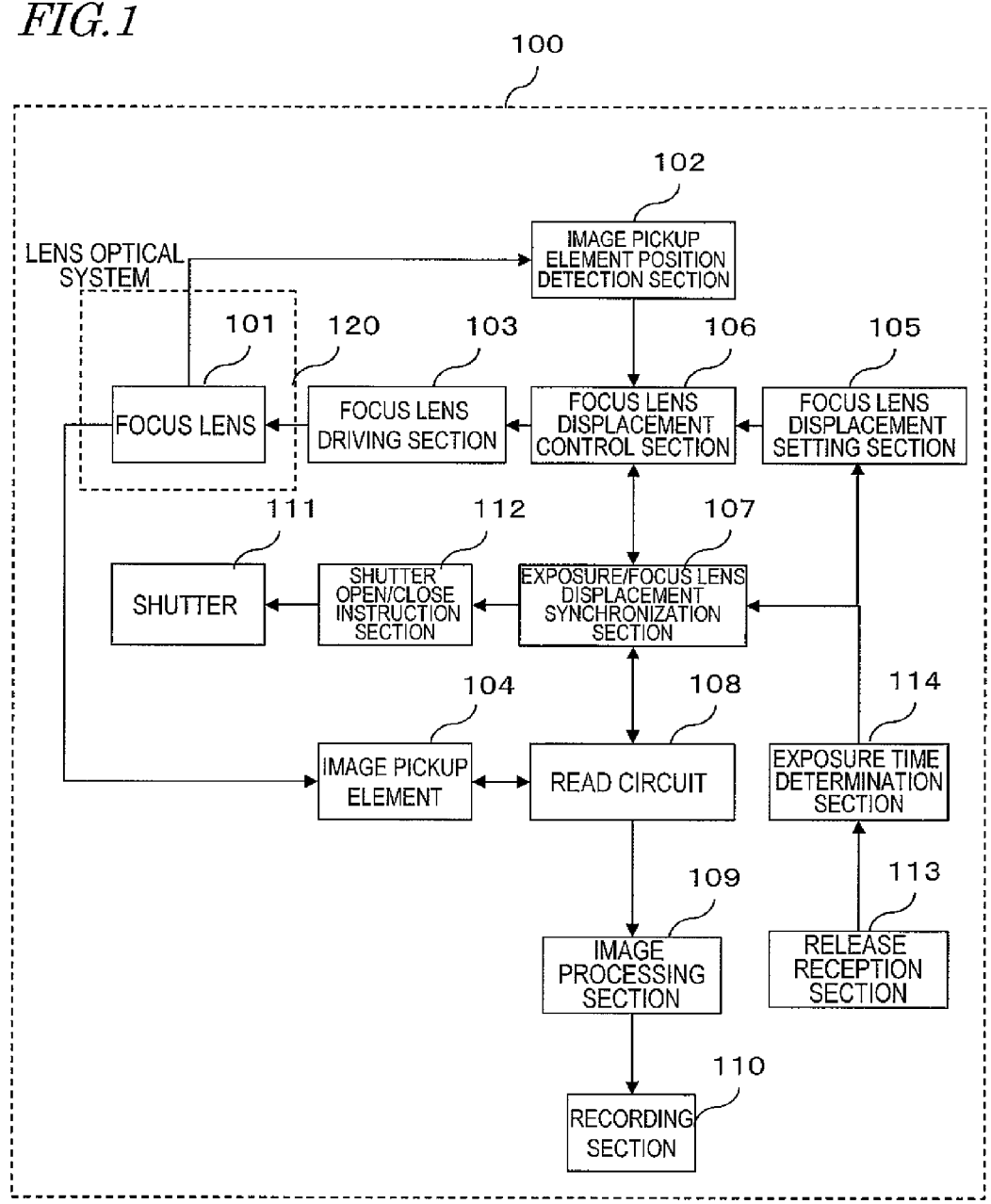
FIG. 1 is a block structural diagram of an image pickup device according to Embodiment 1 and Embodiment 3.

FIG. 1 is a block structural diagram showing an image pickup device 100 in this embodiment. The image pickup device 100 includes the focus lens driving section 103, the image pickup element 104, the focus lens displacement control section 106, the exposure/focus lens displacement synchronization section 107, and the optical system 120.

In this embodiment, the image pickup element 104 is a CCD image sensor, and includes a plurality of photoelectric conversion elements located two dimensionally and forming an image pickup plane. An image signal is generated by causing light to incident on the plurality of photoelectric conversion elements for exposure and then reading an electrical signal from the plurality of photoelectric conversion elements.

The lens optical system 120 includes the focus lens 101 for collecting light toward the image pickup element 104 and forming an image of an image pickup scene on the image pickup element 104. The lens optical system 120 may include one or more lenses in addition to the focus lens 101 so that an image of a desired subject in image pickup scene is focused. The focus lens 101 may include a plurality of lenses. In the case where the focus lens 101 includes a plurality of lenses, the position of the focus lens is the position of the principal point of the plurality of lenses.

In this embodiment, the focus lens driving section 103 acts as a driving section for driving one of the image pickup element 104 and the focus lens 101 so as to change the distance between the image pickup element 104 and the focus lens 101. Namely, the focus lens driving section 103 drives the focus lens 101 based on a driving signal so as to change the distance between the image pickup element 104 and the focus lens 101.

As described later, the focus lens displacement control section 106 is configured to output an instruction to the focus lens driving section 103 to control the displacement of the focus lens 101 based on a prescribed displacement pattern.

The exposure/focus lens displacement synchronization section 107 is configured to control the focus lens displacement control section 106 based on the timing for exposing the image pickup element 104. The image pickup device 100 further includes the focus lens position detection section 102, a focus lens displacement setting section 105, the read circuit 108, the imaging processing section 109, the recording section 110, the shutter 111, the shutter open/close instruction section 112, the release reception section 113, and the exposure time determination section 114.

The focus lens position detection section 102 includes a position sensor, and detects a position of the focus lens 101 and outputs a detection signal to the focus lens displacement control section 106. The focus lens displacement setting section 105 sets a displacement pattern of the focus lens 101 as a target position of the focus lens. As a result, the focus lens displacement control section 106 calculates a driving signal from the difference between the target position of the focus lens and the current position of the focus lens 101 detected by the focus lens position detection section 102, and outputs the driving signal to the focus lens driving section 103.

When the release reception section 113 receives an exposure start instruction from the user, the exposure time determination section 114 determines an exposure time duration of the image pickup element 104. The exposure time determination section 114 also outputs information on the exposure time duration to the exposure/focus lens displacement synchronization section 107 and the focus lens displacement setting section 105.

Based on the information on the exposure time duration, the exposure/focus lens displacement synchronization section 107 outputs an instruction to the shutter open/close instruction section 112, the focus lens displacement control section 106 and the read circuit 108 to perform exposure at a timing synchronized to the exposure, to drive the focus lens 101 and to read an electrical signal from the image pickup element 104, respectively. Specifically, the exposure/focus lens displacement synchronization section 107 instructs the shutter open/close instruction section 112 of the timing of exposure and the exposure time duration. The exposure/focus lens displacement synchronization section 107 also instructs the focus lens displacement control section 106 of the timing for driving the focus lens 101 and the driving time duration.

The shutter 111 performs an open/close operation in response to the instruction from the shutter open/close instruction section 112. When the shutter 111 is in an open state, the image pickup element 104 is exposed to the light collected by the focus lens 111, and the light exposing the image pickup element 104 is converted into an electrical signal and output.

The read circuit 108 outputs a read signal to the image pickup element 104 to read an electrical signal and outputs the read electrical signal to the image processing section 109.

The image processing section 109 performs various corrections or the like on the input electrical signal, constructs an image signal which forms an image of the shooting scene of each one of the video frames, and outputs the image signal to the recording section 110. As described later, the image signal may include three-dimensional information on the shooting scene.

Owing to this, the image pickup device 100 drives the focus lens 101 to change the position thereof while exposing the image pickup element 104, and thus can obtain a sweep image.

Among the above-described elements of the image pickup device 100, the focus lens position detection section 102, the focus lens driving section 103, the image pickup element 104, the imaging processing section 109, the release reception section 113, and the recording section 110 may be formed of known hardware. A part of, or the entirety of, each of the focus lens displacement setting section 105, the focus lens displacement control section 106, the exposure/focus lens displacement synchronization section 107, the read circuit 108, the imaging processing section 109, the recording section 110, the shutter open/close instruction section 112, and the exposure time determination section 114 may be formed of an information processing circuit such as a CPU or the like and software stored on a recording section such as a memory or the like. In this case, the information processing circuit reads the software for defining a procedure of an image pickup method described later from the memory and executes the procedure of the image pickup method, and thus controls the elements of the image pickup device 100. A part of the elements realized by the information processing circuit and the software stored on the memory may be formed of a dedicated integrated circuit. For example, the focus lens displacement setting section 105, the focus lens displacement control section 106, the exposure/focus lens displacement synchronization section 107 and the shutter open/close instruction section 112 may form an integrated circuit.

Now, with reference to FIG. 1, FIG. 2, FIG. 3 and FIG. 4, an image pickup method in this embodiment, especially, the position of the focus lens, the timing for exposing the image pickup element 104, and the timing for reading the signal, for obtaining a sweep image will be described.

Figure 2:
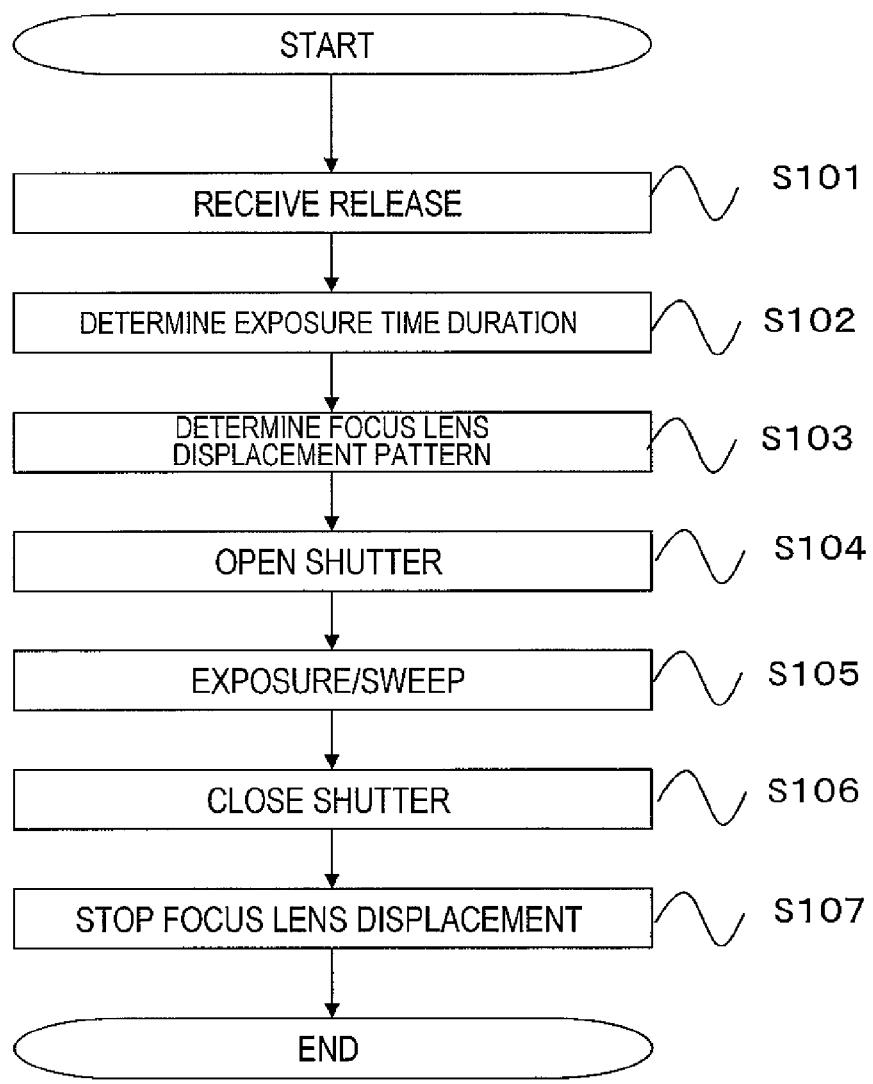
FIG. 2 is a flowchart showing an operation of the image pickup device according to Embodiment 1 and Embodiment 2.

FIG. 2 is a flowchart showing the image pickup method in this embodiment. First, when a release operation by the user is received (S101), the exposure time determination section 114 determines an exposure time duration parameter from shooting parameters such as the shutter speed, diaphragm stop and the like (S102). The exposure time duration parameter is output to the focus lens displacement setting section 105 and the exposure/focus lens displacement synchronization section 107.

Next, the focus lens displacement setting section 105 generates a displacement pattern of the position of the focus lens from the determined exposure time duration parameter (S103). The displacement pattern will be described in detail later.

After the displacement pattern of the position of the focus lens is determined, based on the timing for exposing the image pickup element 104, the exposure/focus lens displacement synchronization section 107 outputs an instruction to the shutter open/close instruction section 112, the focus lens displacement setting section 105 and the read circuit 108 so as to operate the focus lens displacement setting section 105 and the read circuit 108. As a result, the shutter open/close instruction section 112 releases the shutter 111 (S104), the exposure of the image pickup element 104 is started, and the focus lens driving section 103 displaces the focus lens 101 in response to the instruction from the focus lens displacement control section 106 in synchronization with the start of the exposure (S105). The "synchronization" encompasses a case where the operation is performed at the same time and a case where the operation is performed with a prescribed delay time. In addition, at a prescribed timing synchronized with the displacement of the focus lens 101, the electrical signal representing the image of the shooting scene is output from the image pickup element 104 and is output to the read circuit 108.

When the shooting is finished, the shutter 111 is closed (S106), and the displacement of the focus position is stopped (S107). Thus, the shooting is finished. In the case of shooting of a moving image, the exposure and sweep motion may be continued until a recording stop processing instruction is input from the user. In this manner, the sweep images can be obtained continuously, and thus a moving image can be shot.

Now, with reference to FIG. 3 and FIG. 4(a), the exposure and sweep motion will be described in detail.

Figure 3:
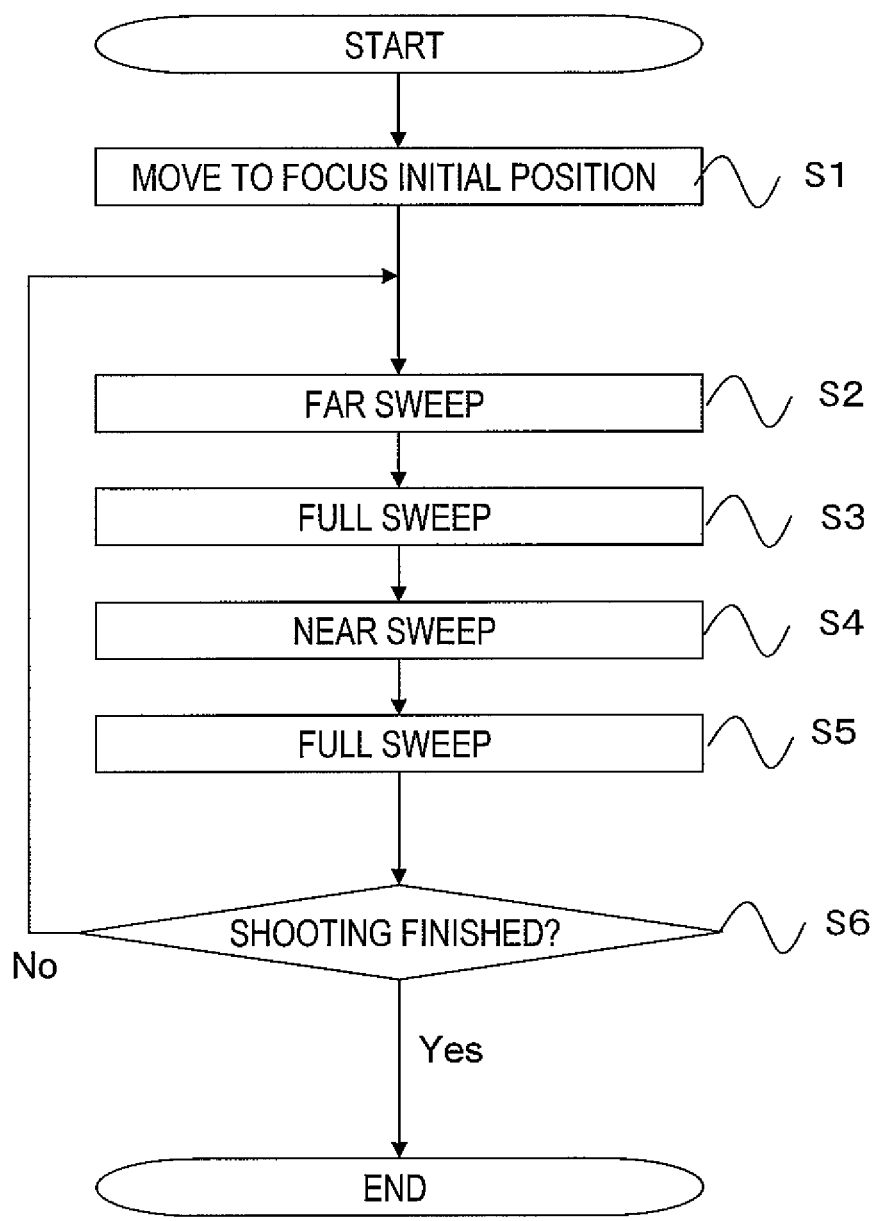
FIG. 3 is a flowchart showing an exposure/sweep step in FIG. 2 in more detail.
Figure 4:
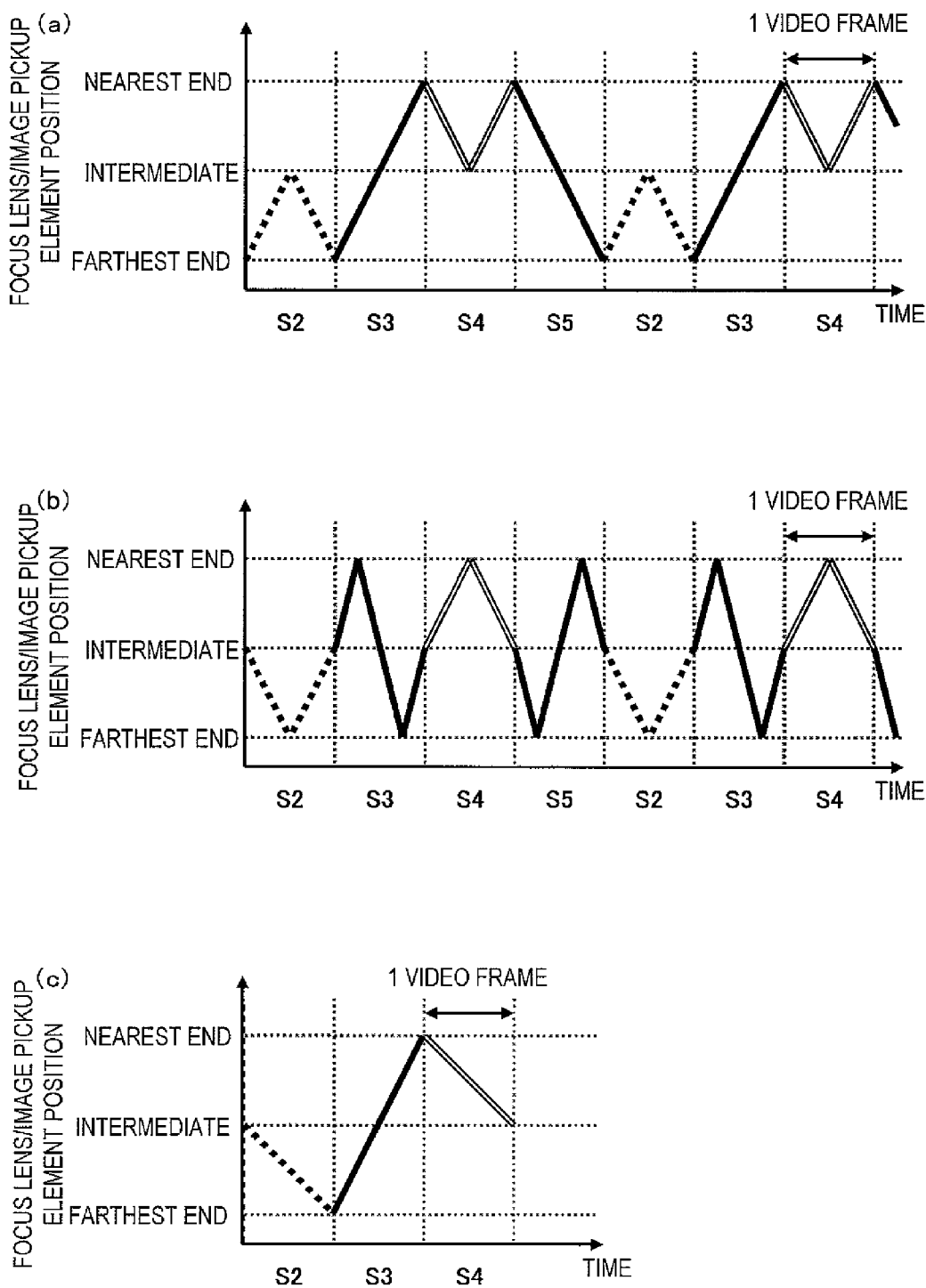
FIG. 4($a$) shows an example of displacement pattern of a focus lens or an image pickup element according to Embodiment 1 and Embodiment 2.

FIG. 3 is a flowchart showing the flow of the sweep motion during the shooting. FIG. 4(a) shows a change of the position of the focus lens in the case where the focus lens is displaced between the farthest end and the nearest end, namely, a sweep pattern (displacement pattern). The horizontal axis represents the time, and the vertical axis represents the position (distance from the image pickup element) of the focus lens. In FIG. 4(a), the solid lines each represent a displacement pattern of full sweep (first type of displacement pattern), and the double lines and the dotted lines each represent a displacement pattern of half sweep (second type of displacement pattern).

More specifically, the double lines each represent a displacement pattern of near sweep (second N type of displacement pattern), and the dotted lines each represent a displacement pattern of far sweep (second F type of displacement pattern).

The displacement range of the displacement pattern of near sweep is the entirety of a zone from the nearest end to an intermediate position between the nearest end and the farthest end. The displacement range of the displacement pattern of far sweep is the entirety of a zone from the farthest end to the intermediate position. Therefore, the displacement ranges of the displacement pattern of near sweep and the displacement pattern of far sweep are different from the displacement range of the displacement pattern of full sweep, and are a part of the displacement range of the displacement pattern of full sweep. The displacement range of the displacement pattern of near sweep and the displacement range of the displacement pattern of far sweep do not overlap each other and exclusive with respect to each other. The intermediate position may not be strictly the center position between the nearest end and the farthest end.

As shown in FIG. 4(a), the displacement pattern of full sweep, the displacement pattern of near sweep and the displacement pattern of far sweep each match a time duration required for the image pickup element 104 to acquire one image, namely, one video frame period. Each of the displacement patterns includes displacement made in the entirety of the displacement range thereof in one direction at least once.

As can be seen from FIG. 4(a), the displacement pattern of full sweep and the displacement pattern of near sweep are continuous to each other, and the displacement pattern of full sweep and the displacement pattern of far sweep are continuous to each other. Therefore, when the displacement of the focus lens 101 is switched from full sweep to half sweep, it is not necessary to cause the position of the focus lens 101 to jump, and thus the focus lens 101 can be smoothly moved.

As described above, the nearest end and the farthest end are the following positions. The focus lens 101 is moved such that images of various subjects included in a prescribed distance range, among subjects included in an image pickup scene and located at various distances from the image pickup device, are focused on the image pickup plane of the image pickup element 104. In this case, the position of the focus lens 101 when the image of the subject nearest to the image pickup device is formed is the nearest end, and the position of the focus lens 101 when the image of the subject farthest from the image pickup device is formed is the farthest end. The subject, the image of which is formed when the focus lens 101 is at the farthest end (first focus position), is located at a position away from the image pickup device by the longest distance (first subject distance) in the prescribed distance range. The subject, the image of which is formed when the focus lens 101 is at the nearest end (second focus position), is located at a position away from the image pickup device by the shortest distance (second subject distance) in the prescribed distance range. As shown in FIG. 3 and FIG. 4(a), first, the focus lens driving section 103 moves the focus lens 101 to the farthest end, which is the initial position, based on the instruction from the focus lens displacement control section 106 (S1). Next, the focus lens driving section 103 displaces the focus lens 101 between the farthest end and the intermediate position in accordance with the displacement pattern of far sweep. More specifically, the lens driving section 103 displaces the focus lens 101 such that the focus lens 101 goes from the farthest position to the intermediate position and then returns to the farthest position (S2). Namely, the focus lens driving section 103 causes the focus lens 101 to make a half sweep motion in accordance with the displacement pattern of far sweep.

Next, the focus lens 101 makes a full sweep motion so as to be displaced from the farthest end to the nearest end in accordance with the displacement pattern of full sweep (S3). Then, the focus lens driving section 103 displaces the focus lens 101 such that the focus lens 101 goes from the nearest end to the intermediate position and then returns to the nearest end in accordance with the displacement pattern of near sweep; namely, causes the focus lens 101 to make a half sweep motion again (S4). Then, again, the focus lens 101 makes a full sweep motion so as to be displaced from the farthest end to the nearest end in accordance with the displacement pattern of full sweep (S5). Thus (S2 through S5), one cycle of sweep motion of the focus lens in this embodiment is finished. For shooting a moving image, this operation is repeated.

It is checked whether or not the user has input an instruction to finish the shooting (S6). When it is instructed to finish the shooting, the sweep motion is finished.

Now, a method for finding three-dimensional information from the obtained sweep images will be described. For example, the image processing section 109 may be configured to find the three-dimensional information on the shooting scene. First, exposure is performed while the focus lens 101 is moved by full sweep, namely, in accordance with the displacement pattern of full sweep, and thus the electric signal of the image is obtained (S3). This electrical signal is processed by an image processing method disclosed in Non-Patent Document 1 or the like, and thus an all-in-focus image can be obtained. In addition, exposure is performed while the focus lens 101 is moved by half sweep, namely, in accordance with the displacement pattern of far sweep and the displacement pattern of near sweep before and after the displacement pattern of the full sweep, and thus the electric signals of the images are obtained (S2 and S4). These electrical signals are processed by an image processing method disclosed in Non-Patent Document 2 or the like, and thus depth information on the shooting scene is obtained.

The three-dimensional information on the shooting scene can be obtained by use of the all-in-focus image and the depth information. Namely, the three-dimensional information on one scene can be obtained from one full sweep image, and the far sweep image and the near sweep image shot at the timing before and after the full sweep image, i.e., three images in total. For example, an image focused on an arbitrary subject which is located between the farthest end and the nearest end in the shooting scene can be re-constructed. According to this embodiment, a half sweep image is used for estimating the depth. As described above, the depth estimation based on a half sweep image is more precise than the depth estimation based on a full sweep image. Therefore, the precision of the three-dimensional information obtained in this embodiment is high.

According to this embodiment, the displacement pattern of full sweep is sandwiched between the displacement pattern of far sweep and the displacement pattern of near sweep. Specifically, the displacement pattern of full sweep in step S3 is sandwiched between the displacement pattern of far sweep in step S2 and the displacement pattern of near sweep in step S4. The displacement pattern of full sweep in step S5 is sandwiched between the displacement pattern of near sweep in step S4 and the displacement pattern of far sweep in step S2. In this manner, any displacement pattern of full sweep is sandwiched between two displacement patterns of half sweep. Therefore, shooting can be performed for obtaining half sweep images before and after the shooting for obtaining a full sweep image, and thus an all-in-focus image, a near sweep image and a far sweep image can be acquired in succession. Thus, as described above, the three-dimensional information on the shooting scene can be obtained. As can be seen from FIG. 4(a), the displacement pattern used in this embodiment has four video frame periods as one cycle. However, the all-in-focus image and the above-described three-dimensional information are obtained at a cycle of two video frame periods. Therefore, according to this embodiment, a smooth EDOF moving image can be obtained. For example, when an image pickup element capable of performing image pickup at 30 fps is used, a three-dimensional moving image of 15 fps can be obtained. When an image pickup element capable of performing higher-speed image pickup is used, an EDOF moving image which is smoother (of higher frame rate) is realized.

According to this embodiment, an all-in-focus image is obtained by use of a displacement pattern of full sweep having a length matched to one video frame period. Therefore, the entirety of the all-in-focus image is acquired at a matched timing. Thus, the obtained all-in-focus image looks natural. For these reasons, according to this embodiment, an EDOF moving image which is of a high quality, presents no unnaturalness and is smooth can be obtained.

In this embodiment, the initial position of the focus lens is set to the farthest end. The initial position of the focus lens may be the nearest end. For shooting a still image by the image pickup device 100 in this embodiment, merely an all-in-focus image, a near sweep image and a far sweep image which are continuous are required. Thus, the displacement pattern used in this embodiment does not need to include the displacement pattern in step S5.

The three-dimensional information may be obtained by use of a signal processing section other than the image processing section 109; for example, a computer or an signal processing section external to the image pickup device 100.

FIG. 4(b) shows another example of sweep pattern which realizes shooting of a three-dimensional moving image. The order of the displacement patterns is the same as that in the example described with reference to FIG. 4(a), but the start position of each displacement pattern is the intermediate position unlike in the example described with reference to FIG. 4(a). The displacement pattern of full sweep starts from the intermediate position to the nearest end, then moves to the farthest end, and then returns to the intermediate position. According to this example, the time duration in which the focus lens 101 is moved to the initial position at the start of shooting is generally shortened, and thus the shooting can be started more quickly.

FIG. 4(c) shows still another example of sweep pattern which realizes shooting of a three-dimensional moving image. The order of the displacement patterns is the same as that in the example described with reference to FIG. 4(a), but each displacement pattern has only one direction of displacement unlike in the example described with reference to FIG. 4(a). According to this example, each displacement pattern does not include displacement of making a reciprocating motion. Therefore, the displacement distance of the focus lens 101 is shortened, which can decrease the power consumption of the image pickup device 100. This sweep pattern is preferably usable when continuous shooting is not required; for example, for shooting a still image. It should be noted that the displacement pattern in this example may be used for shooting a moving image. According to this example, an all-in-focus image and three-dimensional information are obtained at a cycle of three video frame periods, which is of a rate merely slightly lower than that in the examples described with reference to FIGS. 4(a) and (b). Thus, the image pickup device in which the focus lens is displaced in the pattern in this example is preferably usable as a low power consumption image pickup device for uses in which smoothness of the moving image is not specifically important; for example, for a surveillance camera.

(Embodiment 2)

Figure 5:
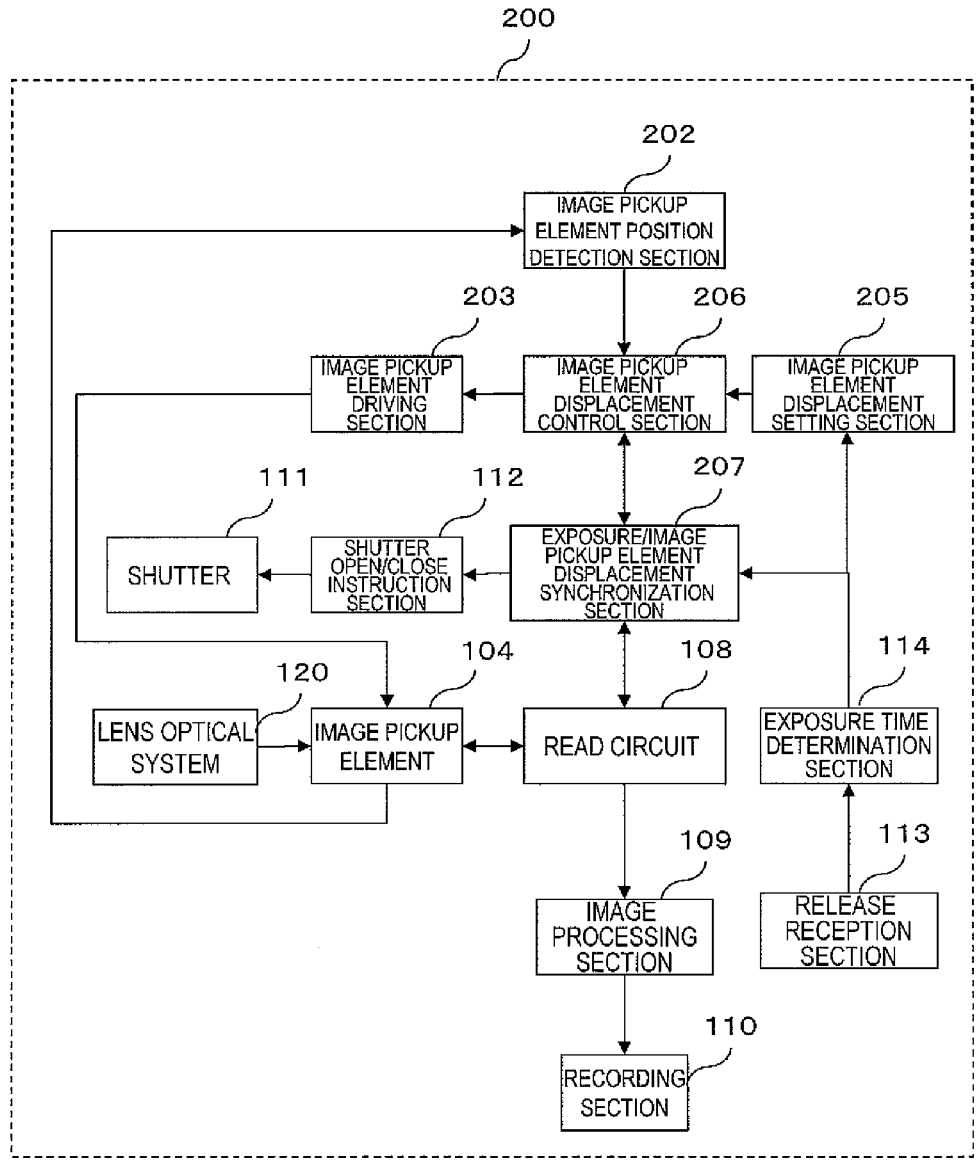
FIG. 5 is a block structural diagram of an image pickup device according to Embodiment 2.
Figure 6:
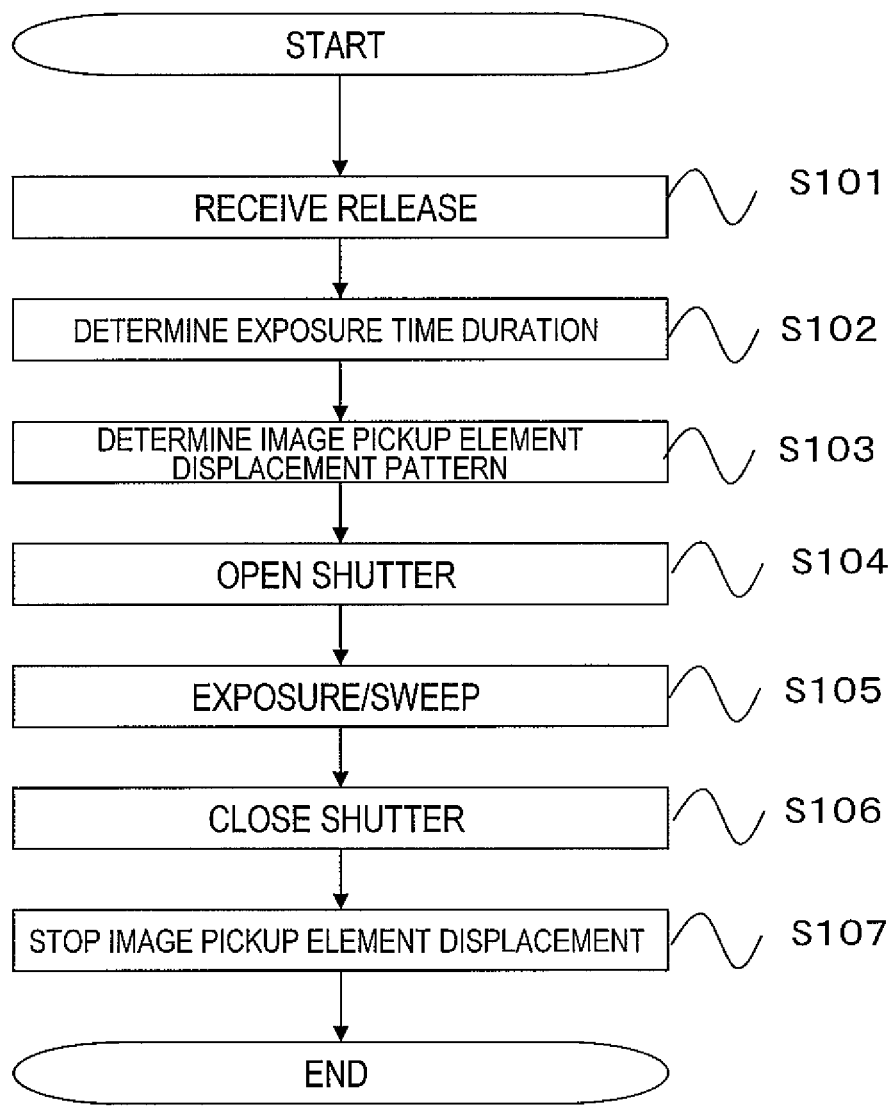
FIG. 6 is a flowchart showing an operation of the image pickup device according to Embodiment 2.

With reference to FIG. 5 and FIG. 6, an image pickup device, an integrated circuit, and an image pickup method in Embodiment 2 according to the present invention will be described.

FIG. 5 is a block structural diagram showing an image pickup device 200 in this embodiment. Identical elements to those of the image pickup device 100 in Embodiment 1 bear identical reference signs thereto. Unlike the image pickup device 100, the image pickup device 200 moves the position of the image pickup device 104 to change the distance between the lens optical system 120 and the focus lens 101.

For this purpose, the image pickup device 200 includes the image pickup element position detection section 202, the image pickup element driving section 203, an image pickup element displacement setting section 205, the image pickup element displacement control section 206, and the exposure/image pickup element displacement synchronization section 207.

The image pickup element position detection section 202 includes a position sensor, and detects a position of the image pickup element 104 and outputs a detection signal to the image pickup element displacement control section 206. The image pickup element displacement setting section 205 sets a displacement pattern of the image pickup element 104 as a target position of the image pickup element. As a result, the image pickup element displacement control section 206 calculates a driving signal from the difference between the target position of the image pickup element and the current position of the image pickup element 104 detected by the image pickup element position detection section 202, and outputs the driving signal to the image pickup element driving section 203.

When the release reception section 113 receives an exposure start instruction from the user, the exposure time determination section 114 determines an exposure time duration of the image pickup element 104. The exposure time determination section 114 also outputs information on the exposure time duration to the exposure/image pickup element displacement synchronization section 207.

Based on the information on the exposure time duration, the exposure/image pickup element displacement synchronization section 207 outputs an instruction to the shutter open/close instruction section 112, the image pickup element displacement control section 206 and the read circuit 108 to perform exposure at a timing synchronized to the exposure, to drive the image pickup element 104 and to read an electrical signal from the image pickup element 104, respectively. Specifically, the exposure/image pickup element displacement synchronization section 207 instructs the shutter open/close instruction section 112 of the timing of exposure and the exposure time duration. The exposure/image pickup element displacement synchronization section 207 also instructs the image pickup element displacement control section 206 of the timing for driving the image pickup element 104 and the driving time duration. Owing to this, the image pickup device 200 can drive the image pickup element 104 to change the position thereof while exposing image pickup element 104, and thus can obtain a sweep image.

FIG. 6 is a flowchart showing the image pickup method in this embodiment. The image pickup method is the same as that in Embodiment 1 described with reference to FIG. 2, except that the image pickup element is displaced in order to change the distance between the image pickup element and the focus lens.

The displacement patterns of the image pickup element are the same as the displacement patterns of the focus lens described in Embodiment 1 with reference to FIGS. 4(a), (b) and (c).

As can be seen, even with a structure of driving the image pickup element to change the position thereof, an EDOF moving image can be obtained as in Embodiment 1.

(Embodiment 3)

The image pickup devices in Embodiments 1 and 2 each use a CCD image sensor as the image pickup element. The COD image sensor is capable of performing a global shutter operation of reading all the pixels at the same time. Therefore, the displacement patterns of the focus lens in the image pickup devices in Embodiments 1 and 2 are suitable to the CCD image sensor. In this embodiment, an image pickup device, an integrate circuit and an image pickup method which use a CMOS image sensor as the image pickup element will be described.

An image pickup element formed of a CMOS image sensor is suitable to read a great number of pixels, and an image pickup element capable of reading 60 frames of an image of a size of Full HD (1920×1080) per second is realized.

For continuously reading charges obtained by exposing an image pickup element formed of a CMOS image sensor, an electronic shutter control system referred to as "rolling shutter" is used. According to the rolling shutter system, a set of pixels located two-dimensionally is sequentially scanned in units of column or any other portion and thus a charge is read from each pixel.

Figure 7:
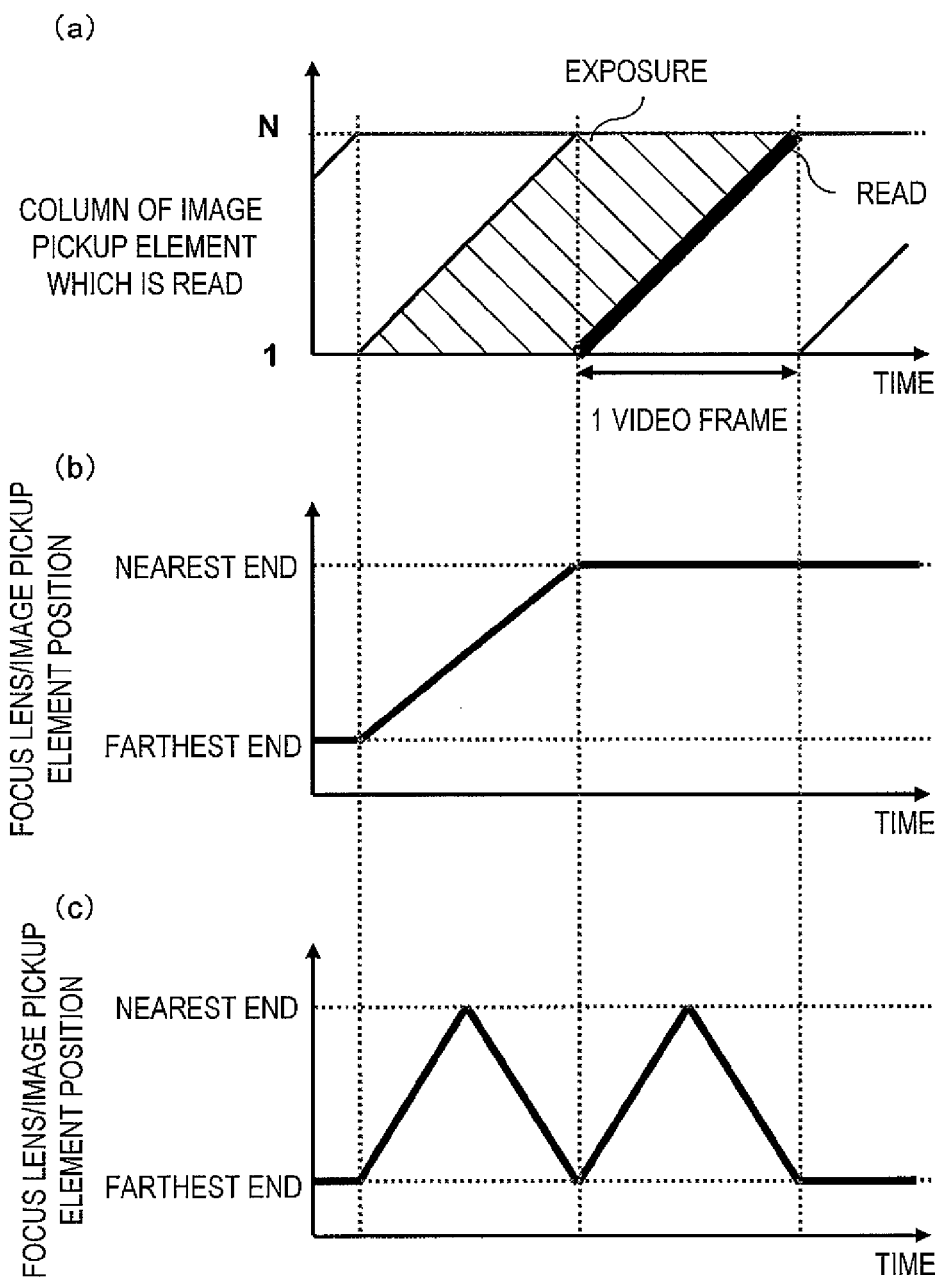
FIG. 7($a$) shows a rolling shutter operation of an image pickup element formed of a CMOS image sensor.

FIG. 7(a) shows the timing for reading charges from a set of pixels in such an image pickup element. The horizontal axis represents the time, and the vertical axis represents the position of the column in the image pickup element at which the charges are read. The image pickup element includes a plurality of (in this example, N number of) columns of pixels. As shown in FIG. 7(a), the image pickup element is sequentially scanned from the first column to read the charges. Immediately after that, the charges are accumulated. After a prescribed time duration, the image pickup element is scanned again to read a charge from each pixel. Thus, an image signal is obtained. After the N'th column is scanned, the image pickup element is scanned again from the first column. In this manner, a continuous moving image can be obtained. As can be seen from FIG. 7(a), when shooting is performed by the rolling shutter system, the shooting timing is shifted in the plane of the image pickup element. The shift between the first column and the last column is one video frame period at the maximum.

For acquiring an image by the F-DOF system, the focus state needs to be displaced from the farthest end to the nearest end in a prescribed focus range, so that all the pixels in the plane of the image pickup element are exposed uniformly. FIG. 7(b), which corresponds to the horizontal axis of FIG. 7(a), shows a displacement pattern when the focus lens sweeps from the farthest end to the nearest end within one video frame period by use of the rolling shutter system. When the image pickup element is exposed at the timing shown in FIG. 7(a), the focus lens is moved in the entire range from the farthest end to the nearest end within the exposure time duration of the first column. However, in the exposure time duration of the N'th column, the focus lens is located only at the nearest end. In the exposure time duration of the columns between the first column and the N'th column, the focus lens is displaced in only a part of the range from the farthest end to the nearest end. Therefore, when the focus lens is displaced at the timing shown in FIG. 7(b), a correct sweep image cannot be obtained.

FIG. 7(c) shows an example of displacement pattern which is suitable to an image pickup element formed of a CMOS image sensor. The displacement pattern shown in FIG. 7(c) starts from the farthest end, reaches the nearest end, and then returns to the farthest end within one video frame period; namely, this displacement pattern makes one reciprocating motion between the farthest end and the nearest end within one video frame period. In this example, the exposure time duration matches one video frame period, and thus the reciprocating motion of the displacement pattern matches one video frame period. It is sufficient that the reciprocating motion is synchronized to the exposure time duration. Namely, it is sufficient that the reciprocating motion is made for a time duration which matches an integral multiple of the exposure time duration, the integral multiple being at least two. In FIG. 7(c), the same displacement pattern is continued during two video frame periods, namely, two reciprocating sweep motions are performed. Owing to this, all the pixels in the plane of the image pickup element can be exposed uniformly.

Figure 8:
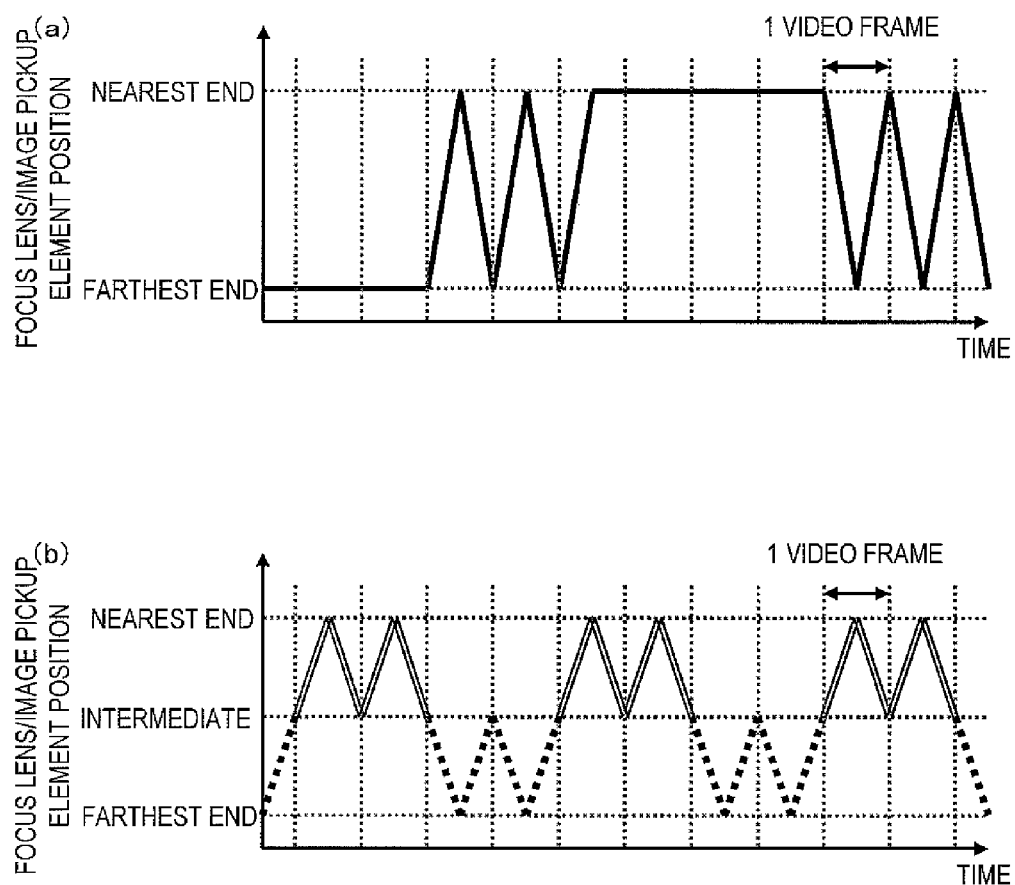
FIGS. 8($a$) and ($b$) each show an example of displacement pattern of the focus lens for obtaining a full sweep image and a half sweep image by use of an image pickup element formed of a CMOS image sensor.

FIGS. 8(a) and (b) each show an example of displacement pattern of the focus lens for obtaining a full sweep image and a half sweep image by use of an image pickup element formed of a CMOS image sensor. As shown in FIG. 8(a), in order to obtain one full sweep image, the focus lens merely needs to make two reciprocating sweep motions. However, for DFD, it is preferable to move the focus position from the farthest end to the nearest end. Therefore, the focus lens is moved from the farthest end to the nearest end, although exposure (shooting) is not performed. A reason for this is that the focus lens returns to the start position by the reciprocating motion.

As shown in FIG. 21(b), for obtaining a half sweep image, the displacement pattern of near sweep and the displacement pattern of far sweep both have the start position at the above-described intermediate position. Therefore, even though a reciprocating motion is performed, the focus lens does not need to be moved while no shooting is performed.

Now, an image pickup device, an integrated circuit and an image pickup method using an image pickup element formed of a CMOS image sensor in an embodiment will be described.

The image pickup device in this embodiment has an image pickup element 104 formed of a CMOS image unlike the image pickup element 104 in Embodiment 1. Except for this, the structure of the device and the image pickup method are the same as those of Embodiment 1. Thus, differences will be described especially.

FIGS. 9(a) and (b) each show an example of displacement pattern of the focus lens used for the image pickup device in this embodiment. FIGS. 9(a) and (b) respectively correspond to FIGS. 4(a) and (b) in Embodiment 1.

As shown in FIG. 9(a), the displacement pattern of the focus lens used for the image pickup device in this embodiment includes two reciprocating motions in two video frame periods for image pickup, in each of steps S2 through S5. In each of steps S3 and S5, the displacement pattern includes a one-way movement for moving the position of the focus lens. Since the exposure and the read of the image are performed in units of video frame period, the focus position temporarily stops at a near end or the nearest end. Therefore, shooting of a full sweep image requires three video frame periods in each of steps S3 and S5.

In each of steps S2 and S4, a half sweep image is shot by two reciprocating sweep motions. This requires two video frame periods. It should be noted that one video frame of wait time is set in consideration of the shooting time of the full sweep image, so that the interval between the shooting of the sweep images is equal. When it is wished to shorten the interval between the shooting of the images, the wait time may be omitted. In this case, the time interval from step S2 to step S3 is not equal to the time interval from step S3 to step S4.

In this manner, the full sweep motion for obtaining an all-in-focus image and the half sweep motion for obtaining depth information are performed alternately in repetition. Regarding the half sweep motion, one near sweep motion and one far sweep motion are performed alternately in repetition. Thus, a three-dimensional moving image can be shot. Thus, even with the image pickup device including the image pickup element formed of a CMOS image sensor, an EDOF moving image which presents no unnaturalness and is smooth can be obtained like in Embodiment 1.

FIG. 9(b) shows another example of sweep pattern which realizes shooting of a three-dimensional moving image using a CMOS type image sensor. The order of shooting of the sweep images is the same as that in the displacement pattern described with reference to FIG. 9(a). However, unlike in the displacement pattern described with reference to FIG. 9(a), the start position of each sweep motion is the intermediate position, and the full sweep motion is a reciprocating sweep motion between the nearest end and the farthest end which starts at the intermediate position.

By use of such a displacement pattern, the time duration in which the focus lens 101 is moved to the initial position at the start of shooting is generally shortened. In addition, the displacement pattern shown in FIG. 9(b) does not include displacement of making a one-way movement for moving the focus lens, which is included in the displacement pattern shown in FIG. 9(a). Therefore, the interval between the shooting of the all-in-focus images is shortened. This is effective to improve the frame rate of the moving image. Specifically, as compared with the case where the displacement pattern shown in FIG. 9(a) is used, the frame rate can be made 1.5 times higher.

In the case where the displacement pattern shown in FIG. 9(b) is used, an all-in-focus image is shot at a cycle of four video frame periods. Thus, when an image pickup element formed of a CMOS image sensor capable of performing image pickup at 60 fps is used, a three-dimensional moving image of 15 fps can be obtained. When an image pickup element capable of performing higher-speed image pickup is used in combination, a further improved effect is provided.

There are cases where an electronic shutter is used to control the exposure time duration in order to restrict the amount of light incident on the image pickup element, for example, when shooting is performed outdoors. In such a case, it is preferable that the sweep pattern is appropriately changed in accordance with the exposure time duration. FIG. 10(a) shows the timing for reading a column of an image pickup element exposed in this manner. In FIG. 10(a), the horizontal axis represents the time, and the vertical axis represents the position of the column of the image pickup element to be read. FIG. 10(b) shows a displacement pattern of the focus lens in this case.

The exposure time duration is shortened by the electronic shutter, and thus the cycle of the reciprocating motion of the displacement pattern is shortened in accordance with the exposure time duration. However, the read time is not shortened. Therefore, the number of times by which the focus lens is displaced between the nearest end and the farthest end in a reciprocating manner in accordance with the displacement pattern after the start of exposure until the read is finished is more than two.

As shown in FIGS. 10(a) and (b), when the focus position is adjusted to be at the nearest end when the read is finished, the focus lens is at approximately the intermediate position between the nearest end and the farthest end at the start of exposure. This initial position of the focus lens is changed in accordance with the exposure time duration varied by the electronic shutter. In a non-exposure state, the position of the focus lens may be any position. In the example shown in FIG. 10(b), the initial position of the focus lens is the nearest end (dotted part in FIG. 10(b)).

FIG. 11 shows an example of displacement pattern for obtaining, by use of an electronic shutter, sweep images equivalent to those obtained by the displacement pattern shown in FIG. 9(b). The order of shooting the sweep images is the same as that in the displacement pattern in FIG. 9(b), but the exposure time duration is shortened by the electronic shutter. Therefore, the cycle of the reciprocating motion in each displacement pattern is shorter. From the initial position of each displacement pattern until the start of exposure, the focus lens may be at any position because no exposure is performed. In the example shown in FIG. 11, the initial position of each displacement pattern is the nearest end or the farthest end in consideration of the continuity with the displacement patterns before and after the displacement pattern. In this manner, performance equivalent to that of the sweep pattern described with reference to FIG. 9(b) can be obtained while the exposure time duration is controlled.

In Embodiment 1, the displacement pattern of the focus lens suitable for shooting a still image is described with reference to FIG. 4(c). It is preferable that the displacement pattern of the focus lens in the image pickup device in this embodiment includes a reciprocating motion as described above. Therefore, it is difficult to adopt a displacement pattern corresponding to that in FIG. 4(c) to this embodiment. For shooting a still image in this embodiment, a displacement pattern for obtaining three continuous sweep images, among the displacement patterns described with reference to FIG. 9 and FIG. 11, may be used.

Figure 9:
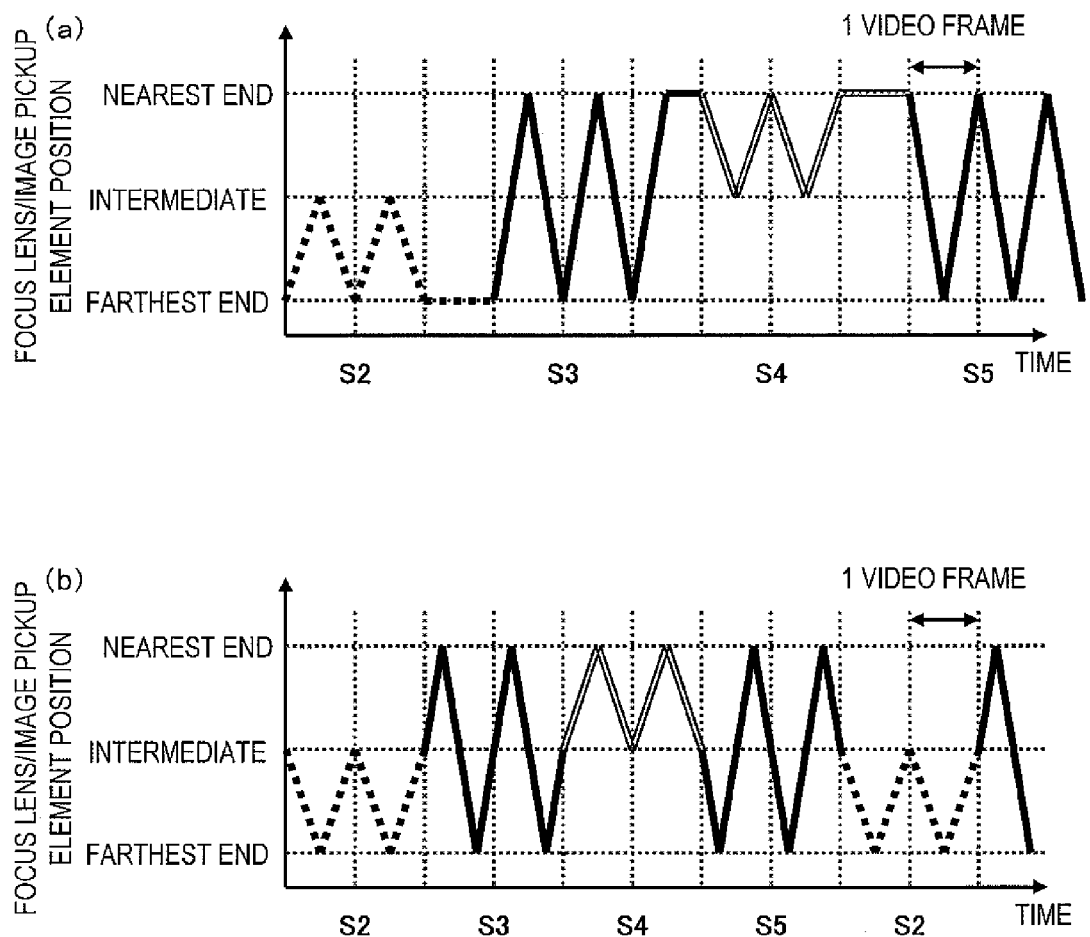
FIGS. 9($a$) and ($b$) each show an example of displacement pattern of the focus lens or the image pickup element in Embodiment 3.
Figure 12:
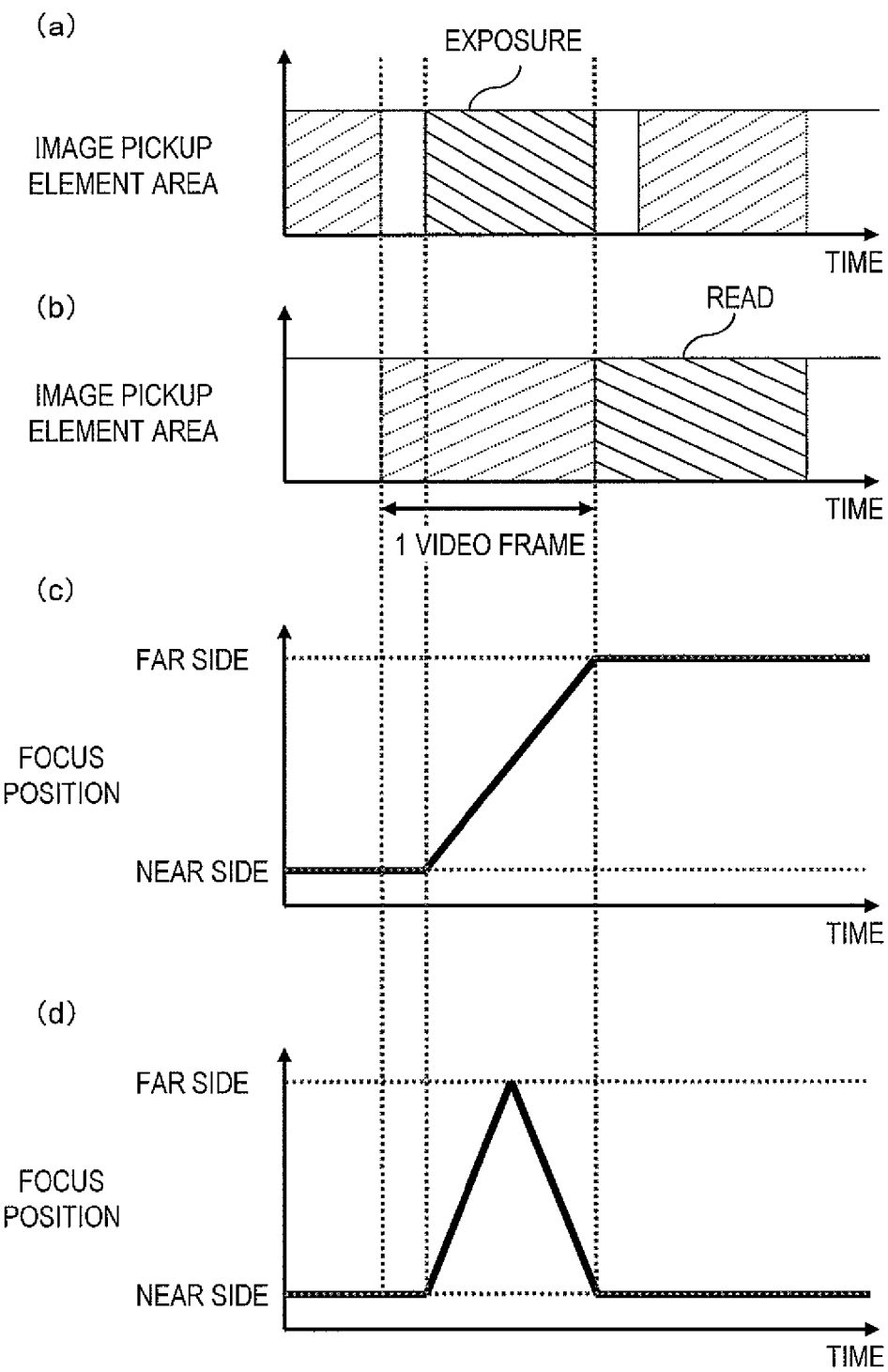
FIGS. 12($a$) and ($b$) each show the timing for exposing the image pickup element.

In this embodiment also, as in Embodiment 2, the image pickup element may be displaced in accordance with any of the displacement patterns shown in FIG. 9 and FIG. 11, instead of the focus lens. In this case also, the above-described effect can be provided.

As can be seen, even when an image pickup element formed of a CMOS image sensor which performs a rolling shutter operation is used, a three-dimensional moving image can be shot by the following method. A full sweep motion for obtaining an all-in-focus image and a half sweep motion for obtaining depth information are repeated alternately. Regarding the half sweep motion, one near sweep motion and one far sweep motion are repeated alternately. For each of the sweep motions, two reciprocating motions are performed in a prescribed sweep range.

Industrial Applicability

According to an image pickup device, an integrated circuit and an image pickup method disclosed by this application, an all-in-focus image and depth information can be obtained alternately in repetition at a high speed by a sweep motion performed in specific manners. The image pickup device, the integrated circuit and the image pickup method disclosed by this application are preferably usable for an image pickup device such as, for example, digital still cameras and digital movie cameras for home use and industrial use.

REFERENCE SIGNS LIST 100, 200, 300, 400 Image pickup device
101 Focus lens
102 Focus lens position detection section
103 Focus lens driving section
104 Image pickup element
105 Focus lens displacement setting section
106 Focus lens displacement control section
107 Exposure/focus lens displacement synchronization section
108 Read circuit
109 Image processing section
110 Recording section
111 Shutter
112 Shutter open/close instruction section
113 Release reception section
114 Exposure time determination section
115 Focus lens position detection section
120 Lens
202 Image pickup element position detection section
203 Image pickup element driving section
205 Image pickup element displacement setting section
206 Image pickup element displacement control section
207 Exposure/image pickup element displacement synchronization section

The invention claimed is:

1. An image pickup device, comprising:
an image pickup element including a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal;
a lens optical system including a focus lens for collecting light toward the image pickup element;
a driving section for driving one of the image pickup element and the focus lens so as to change a distance between the image pickup element and the focus lens;
a displacement control section configured to output an instruction to the driving section to control displacement of the image pickup element or the focus lens which is driven, based on a prescribed displacement pattern; and
a synchronization section configured to control the displacement control section based on timing for exposing the image pickup element;
wherein, where first and second focus positions of the focus lens or the image pickup element provide focusing at first and second subject distances respectively in an image pickup scene, the displacement pattern includes a first type of displacement pattern by which the focus lens or the image pickup element is displaced in a displacement range between the first focus position and the second focus position, and a second type of displacement pattern by which the focus lens or the image pickup element is displaced in another displacement range between the first focus position and the second focus position, the first type of displacement pattern and the second type of displacement pattern being alternately repeated.

2. The image pickup device of claim 1, wherein the displacement range of the first type of displacement pattern includes at least a part of the displacement range of the second type of displacement pattern.

3. The image pickup device of claim 2, wherein the displacement range of the first type of displacement pattern is the entirety of a range between the first focus position and the second focus position.

4. The image pickup device of claim 3, wherein:
the second type of displacement pattern includes a second F type of displacement pattern, the displacement range of which is the entirety of a zone from the first focus position to an intermediate position between the first focus position and the second focus position, and a second N type of displacement pattern, the displacement range of which is the entirety of a zone from the intermediate position to the second focus position; and
the first type of displacement pattern is sandwiched between the second F type of displacement pattern and the second N type of displacement pattern.

5. The image pickup device of claim 4, wherein the first type of displacement pattern, the second F type of displacement pattern and the second N type of displacement pattern each include displacement made in the entirety of the displacement range thereof in one direction at least once.

6. The image pickup device of claim 5, wherein the first type of displacement pattern and the second F type of displacement pattern are continuous to each other, and the first type of displacement pattern and the second N type of displacement pattern are continuous to each other.

7. The image pickup device of claim 1, further comprising:
an exposure time determination section for determining an exposure time duration of the image pickup element based on the image pickup scene; and
a displacement setting section for determining the displacement pattern based on the first focus position, the second focus position and the exposure time duration.

8. The image pickup device of claim 7, further comprising a position detection section for detecting a position of the image pickup element or the focus lens which is driven;
wherein the displacement control section instructs the driving section of a driving amount based on an output of the position detection section and the displacement pattern.

9. The image pickup device of claim 8, further comprising a read circuit for reading the image signal from the image pickup element;
wherein the synchronization section controls the displacement control section and the read circuit based on the timing for exposing the image pickup element.

10. The image pickup device of claim 1, which generates an all-in-focus image based on the first type of displacement pattern from the image signal obtained during displacement of the image pickup element or the focus lens which is driven.

11. The image pickup device of claim 1, which generates depth information based on the second type of displacement pattern from the image signal obtained during displacement of the image pickup element or the focus lens which is driven.

12. The image pickup device of claim 1, wherein the image pickup element is a CCD image sensor.

13. The image pickup device of claim 1, wherein the image pickup element is a CMOS image sensor.

14. The image pickup device of claim 4, wherein the image pickup element is a CMOS image sensor, and the first type of displacement pattern, the second F type of displacement pattern and the second N type of displacement pattern each make a reciprocating motion in at least the entirety of the displacement range thereof by an integral number of times.

15. An integrated circuit of an image pickup device which includes an image pickup element including a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal; a lens optical system including a focus lens for collecting light toward the image pickup element; and a driving section for driving one of the image pickup element and the focus lens so as to change a distance between the image pickup element and the focus lens;

the integrated circuit comprising:
- a displacement control section configured to output an instruction to the driving section to control displacement of the image pickup element or the focus lens which is driven, based on a prescribed displacement pattern; and
- a synchronization section configured to control the displacement control section based on timing for exposing the image pickup element;

wherein, where first and second focus positions of the focus lens or the image pickup element provide focusing at first and second subject distances respectively in an image pickup scene, the displacement pattern includes a first type of displacement pattern by which the focus lens or the image pickup element is displaced in a displacement range between the first focus position and the second focus position, and a second type of displacement pattern by which the focus lens or the image pickup element is displaced in another displacement range between the first focus position and the second focus position, the first type of displacement pattern and the second type of displacement pattern being alternately repeated.

16. An image pickup method for forming an image of an image pickup scene by collecting light by a focus lens on an image pickup element which includes a plurality of photoelectric conversion elements located two-dimensionally and forming an image pickup plane, the image pickup element being for exposing the plurality of photoelectric conversion elements and reading an electrical signal from the plurality of photoelectric conversion elements to generate an image signal;

wherein, where first and second focus positions of the focus lens or the image pickup element provide focusing at first and second subject distances respectively in an image pickup scene, the plurality of photoelectric elements are exposed while the focus lens or the image pickup element is displaced by a first type of displacement pattern by which the focus lens or the image pickup element is displaced in a displacement range between the first focus position and the second focus position, and by a second type of displacement pattern by which the focus lens or the image pickup element is displaced in another displacement range between the first focus position and the second focus position, the first type of displacement pattern and the second type of displacement pattern being alternately repeated.

* * * * *